Feb. 11, 1958 J. J. OESTREICHER 2,823,370
PROGRAMMER
Filed July 22, 1955 16 Sheets-Sheet 1

INVENTOR
J. J. OESTREICHER
BY
Turner
ATTORNEY

Feb. 11, 1958  J. J. OESTREICHER  2,823,370
PROGRAMMER
Filed July 22, 1955  16 Sheets-Sheet 3

INVENTOR
J. J. OESTREICHER
BY
ATTORNEY

Feb. 11, 1958 J. J. OESTREICHER 2,823,370
PROGRAMMER
Filed July 22, 1955 16 Sheets-Sheet 4

INVENTOR
J. J. OESTREICHER
BY
ATTORNEY

Feb. 11, 1958   J. J. OESTREICHER   2,823,370
PROGRAMMER
Filed July 22, 1955   16 Sheets-Sheet 7
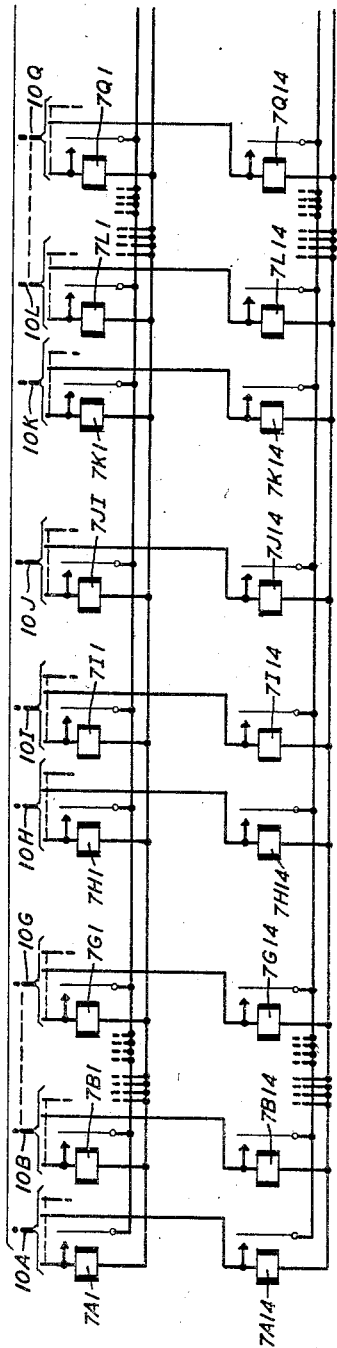
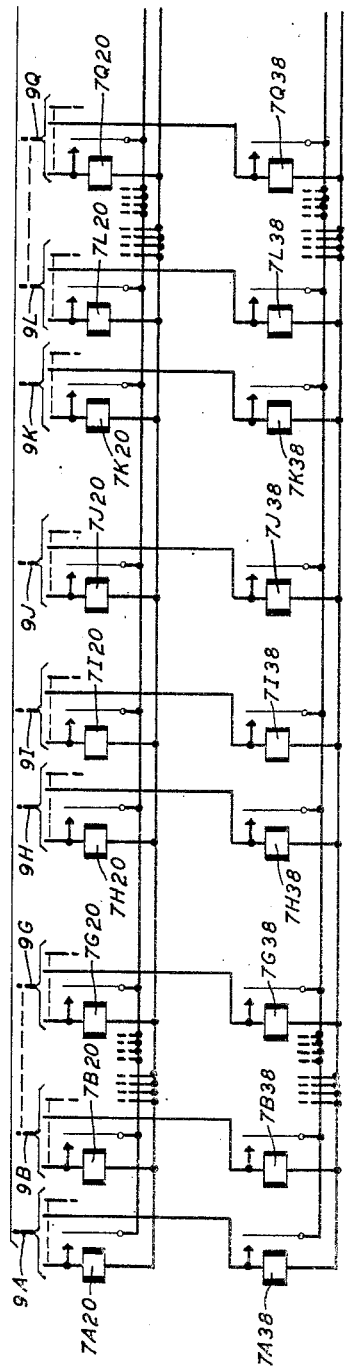
FIG. 7
INVENTOR
J. J. OESTREICHER
BY
ATTORNEY Feb. 11, 1958.  J. J. OESTREICHER  2,823,370
PROGRAMMER
Filed July 22, 1955  16 Sheets-Sheet 8

INVENTOR
J. J. OESTREICHER
BY
ATTORNEY

Feb. 11, 1958  J. J. OESTREICHER  2,823,370
PROGRAMMER
Filed July 22, 1955  16 Sheets-Sheet 9

INVENTOR
J. J. OESTREICHER
BY
ATTORNEY

Feb. 11, 1958     J. J. OESTREICHER     2,823,370
PROGRAMMER
Filed July 22, 1955     16 Sheets-Sheet 10

INVENTOR
J. J. OESTREICHER
BY
ATTORNEY

Feb. 11, 1958 J. J. OESTREICHER 2,823,370
PROGRAMMER
Filed July 22, 1955 16 Sheets-Sheet 16

INVENTOR
J.J. OESTREICHER
BY
ATTORNEY

United States Patent Office 2,823,370
Patented Feb. 11, 1958

2,823,370

PROGRAMMER

John J. Oestreicher, Roselle Park, N. J., assignor to Bell Telephone Laboratories, Incorporated, New York, N. Y., a corporation of New York Application July 22, 1955, Serial No. 523,739

17 Claims. (Cl. 340—173)

This invention relates to signal transmission systems, or programmers, which provide repeatedly or with desired changes in individual orders, a predetermined program of information.

In programmers of this type, it is necessary to provide apparatus for setting up a program, for changing the program once it has been set up, and for transmitting the program. Setting up and changing the program is generally a laborious and time-consuming project requiring either soldering operation or changing of mechanical linkages, and changing the program, moreover, often requires introducing an entire new program which incorporates the change. In addition to these difficulties, it is frequently necessary to transmit a rapidly varying program of information. For example, in the illustrative embodiment of the present invention, the transmitted information may change every one-tenth of a second. In order to provide such a rapidly varying program of information, the interval during which the orders are changed must be exceedingly short, or in the order of milliseconds. This requirement is complicated by the requirement for storing the program information for an indefinite time in order to be able to cyclically repeat the program if so required.

It is an object of the present invention to provide a programmer which may be rapidly set up, in which individual orders may be rapidly changed without disturbing the others, and which can transmit a program of rapidly varying information.

Another object of the present invention is the provision of a programmer which supplies a predetermined program repeatedly or with desired changes in individual order.

These objects are attained in a specific embodiment of the present invention wherein a telephone dial is utilized to rapidly set up the program and to make individual order changes. When an individual order in the program is to be stored, an order number, representing the order position in the program, is dialed. The dial pulses are sent to a counter which adds the pulses for each digit and which registers a coded representation thereof. The counter controls the operation of a translator relay network which supplies a decimal indication of the dialed digits, under control of an order set button, to an order position selector circuit. The order position selector circuit selects a bank of storage or memory components which are individually associated with each order position of the selector circuit. After the bank of memory components has been selected, the program information for the order position is dialed and supplied to the selected bank of memory components. One of the items of program information that is supplied to the bank of memory components is the time that the order position interval is to terminate during the transmission of the program. The time registered in a bank of memory components, in this manner determines when the other items of program information are to be automatically changed during the transmission of the program.

A feature of the present invention relates to apparatus for erasing any one of the program orders without disturbing the others. When a program order is to be erased the order number is dialed and the order set button operated to select the bank of memory components. By thereafter operating an erase button, the information registered in the storage circuit is removed. The new program information for the order position may thereafter be dialed and the new program information registered in the erased memory bank.

Another feature of the present invention relates to means for transmitting the program. When the program is to be transmitted, a transmit button is operated to connect a source of timing pulses to the counter. The counter supplies an indication of elapsed time to a matching circuit which matches the rapidly changing elapsed time indication from the counter with the time registered in the first memory bank. When a match occurs, the selector circuit steps to the next bank of memory components changing the time indication supplied to the matching circuit. During the interval that the time registered in the first bank of memory components is being matched, the items of program information stored in the first bank are supplied to a converter circuit. The converter changes the coded representation of the program information supplied from the first bank to an analogue representation thereof. When the selector circuit steps to the second bank the analogue output changes to a representation of the coded information stored in the second bank. The programmer continues in this manner stepping from one bank to the next bank of memory components every time there is a match until the entire program has been transmitted.

A further feature of the present invention pertains to means for providing a program, electromechanically stored, in which the orders can be changed rapidly, for example as often as every tenth of a second.

Further objects and features will become apparent upon consideration of the following description, taken in conjunction with the accompanying drawings wherein:

Figs. 1 through 14, when arranged in accordance with Fig. 15, are a detailed circuit representation of the programmer of the present invention wherein:

Figs. 7 and 8 illustrate the storage circuit of the present invention;

Fig. 17 illustrates typical programmer output potentials.

Figure 1:
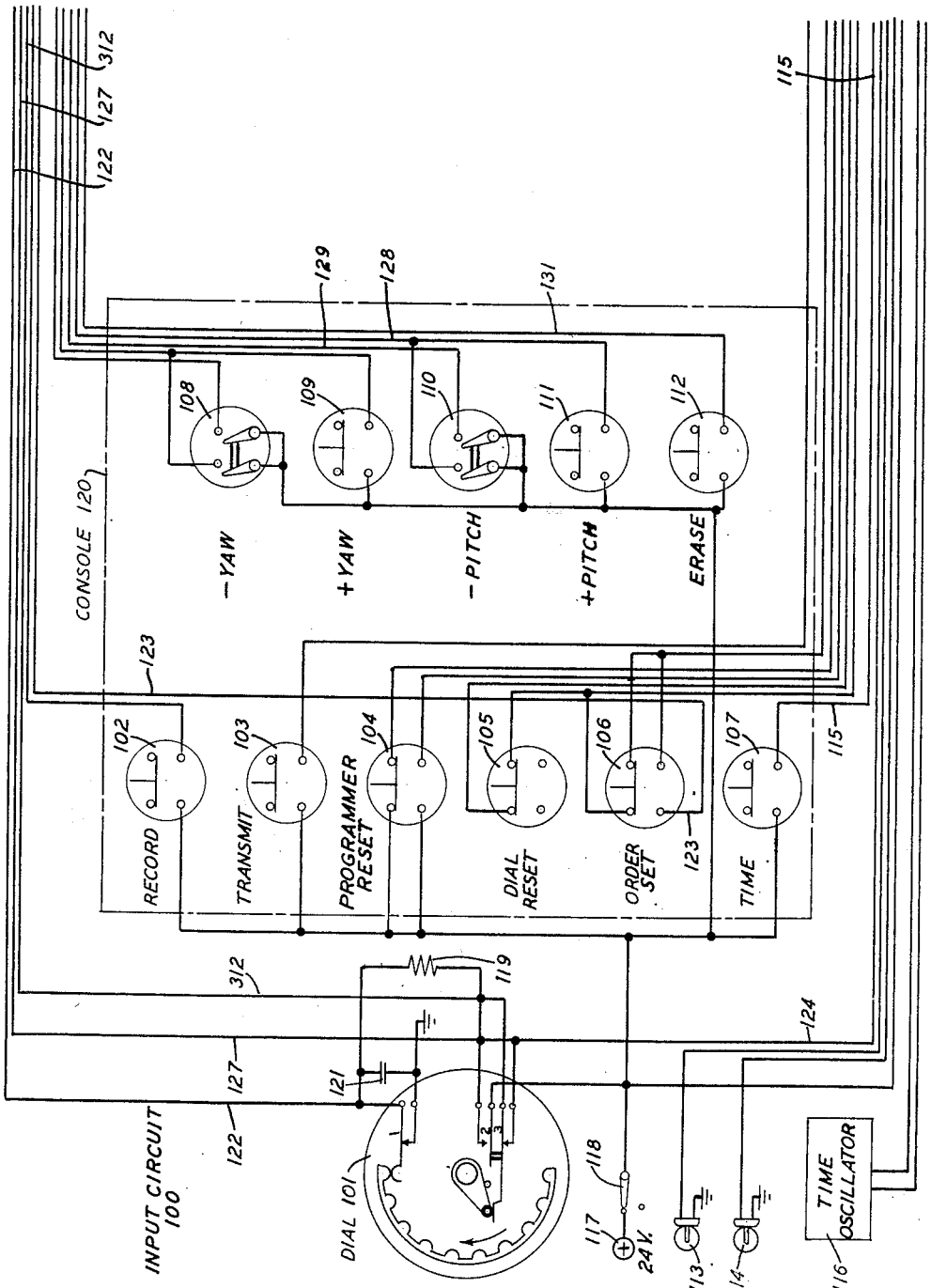
Fig. 1 illustrates the input circuit of the present invention.
Figure 2:
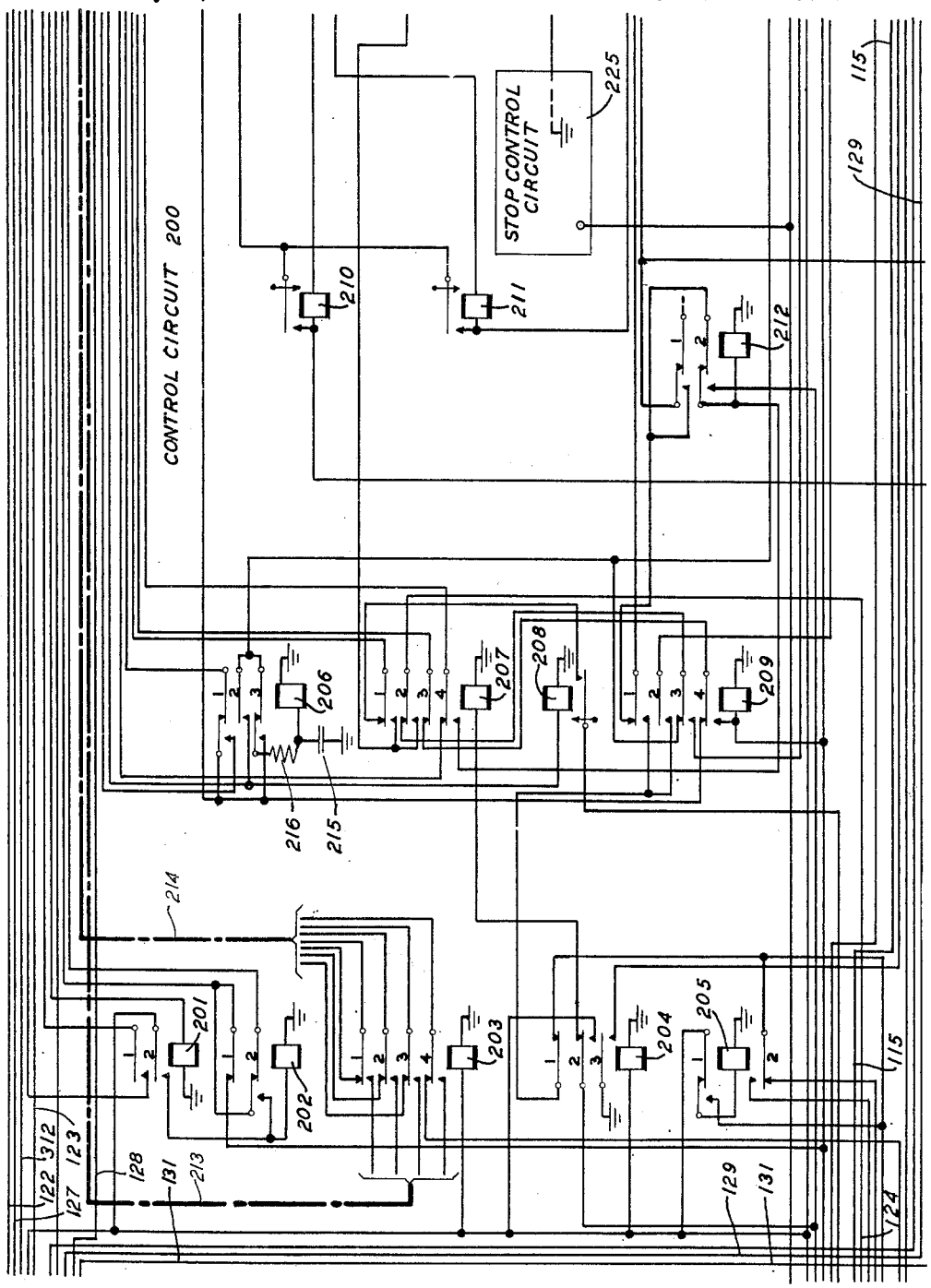
Figs. 2 and 3 illustrate the control circuit of the present invention.
Figure 3:
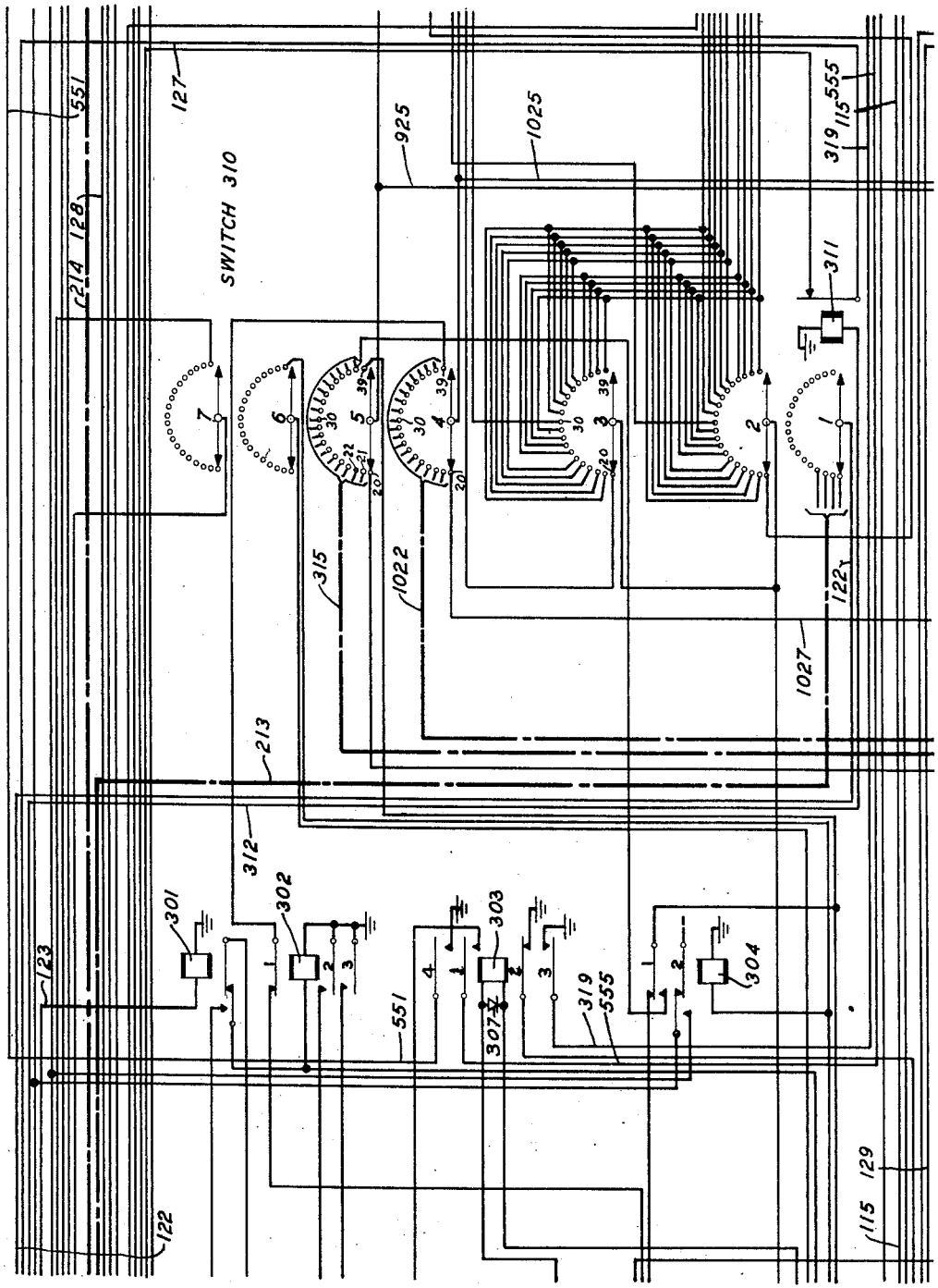
Figure 4:
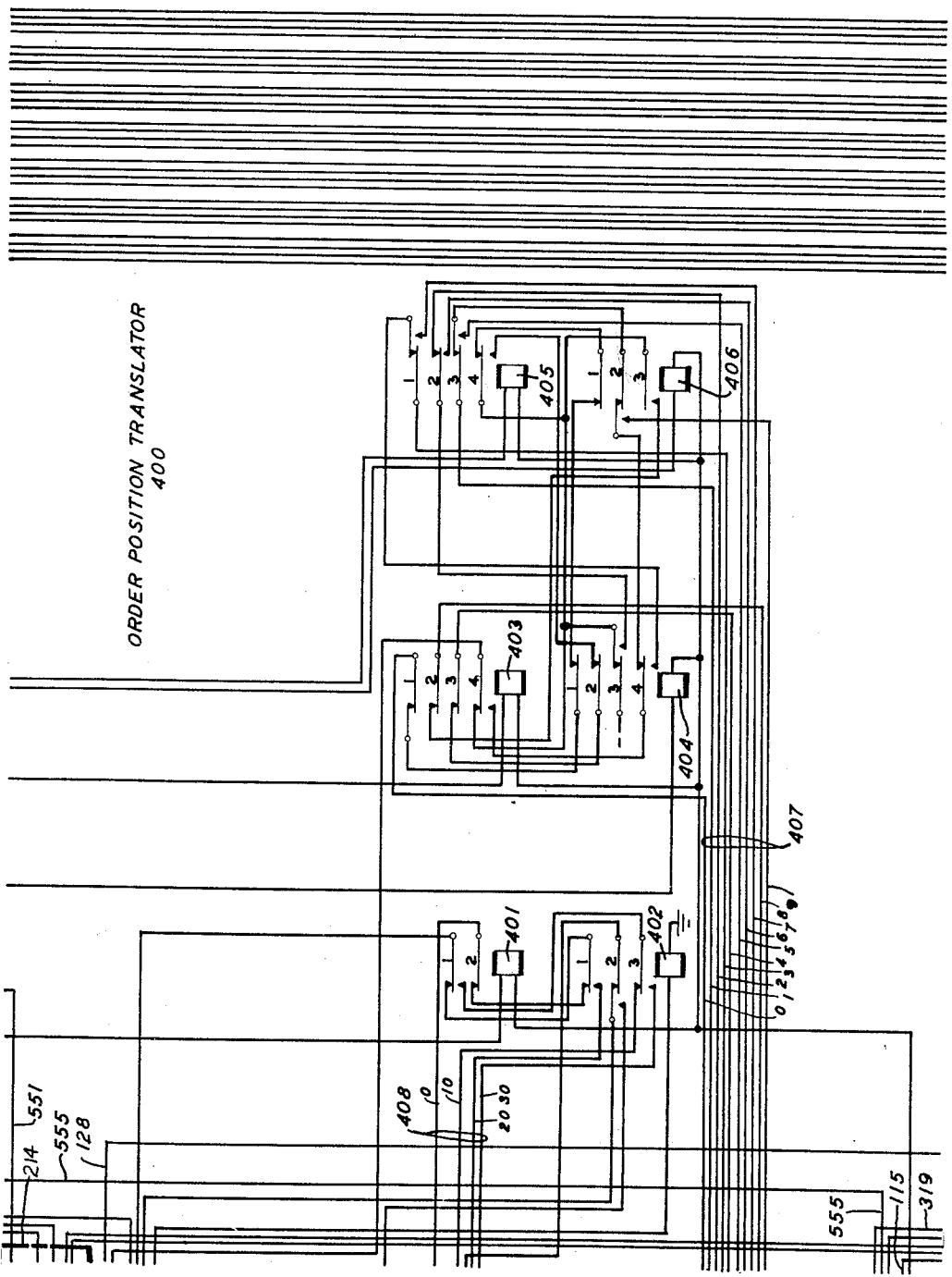
Fig. 4 illustrates the order position translator of the present invention.
Figure 5:
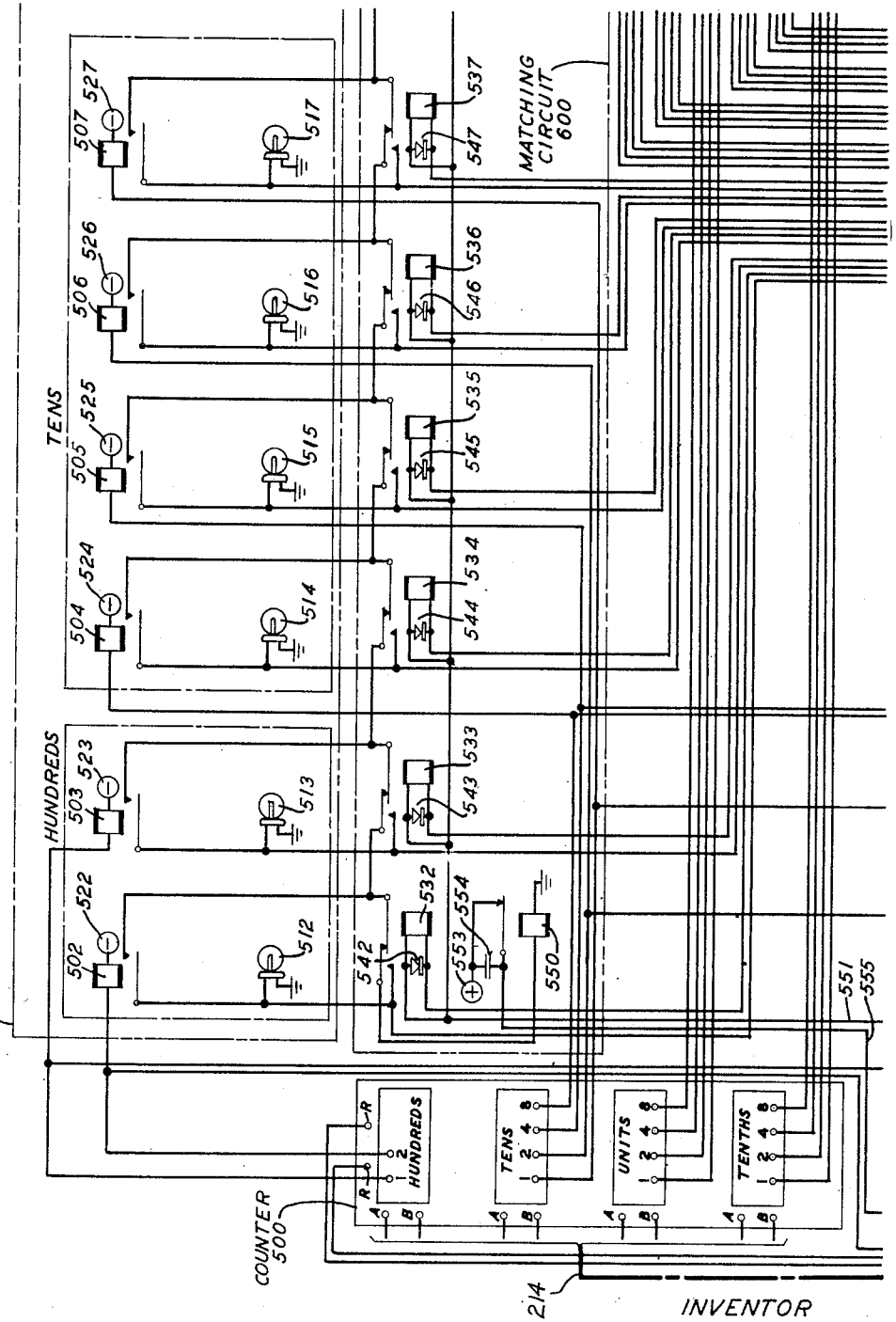
Figs. 5 and 6 illustrate the counter register and matching circuit of the present invention.
Figure 6:
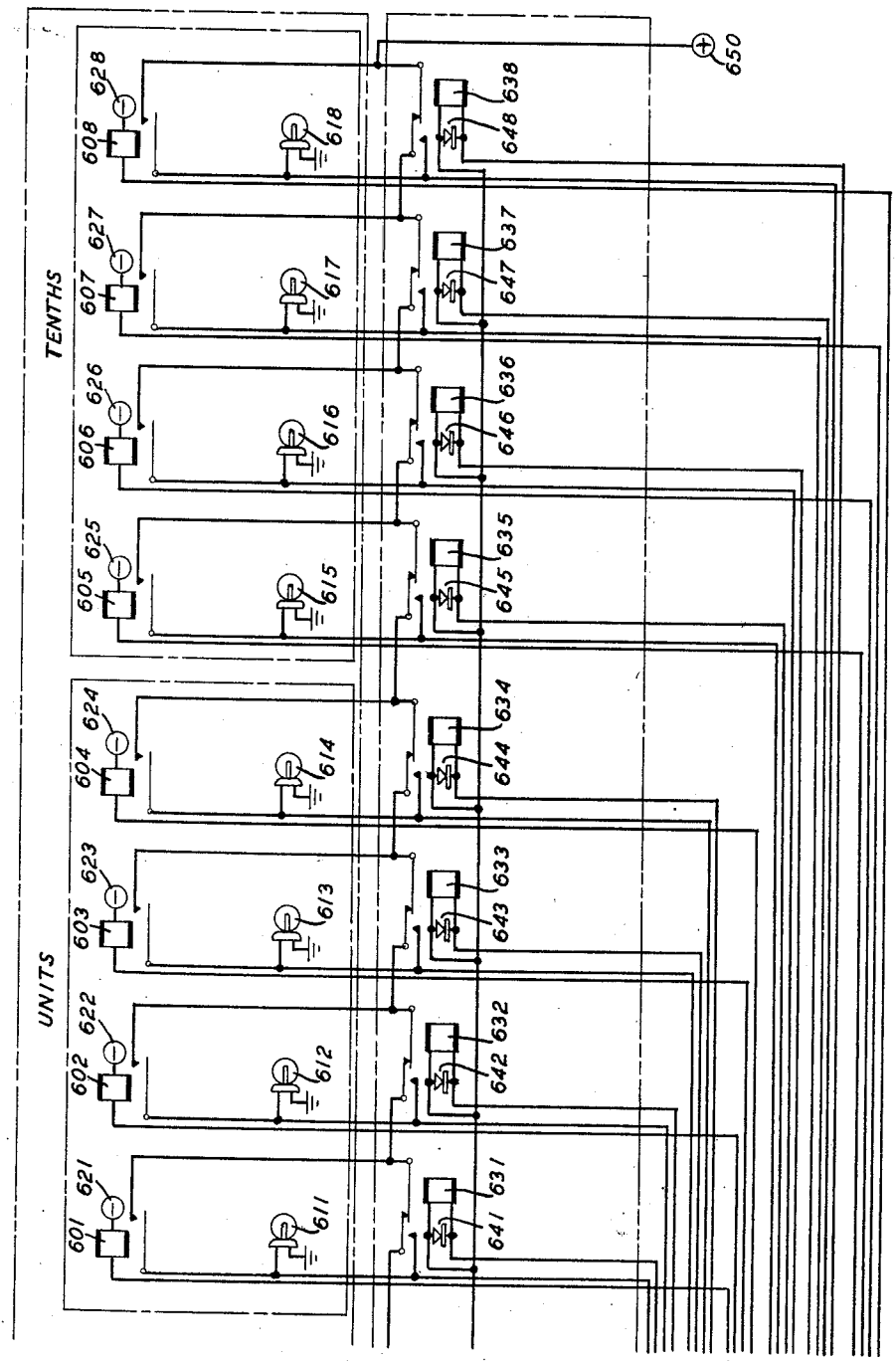
Figure 8:
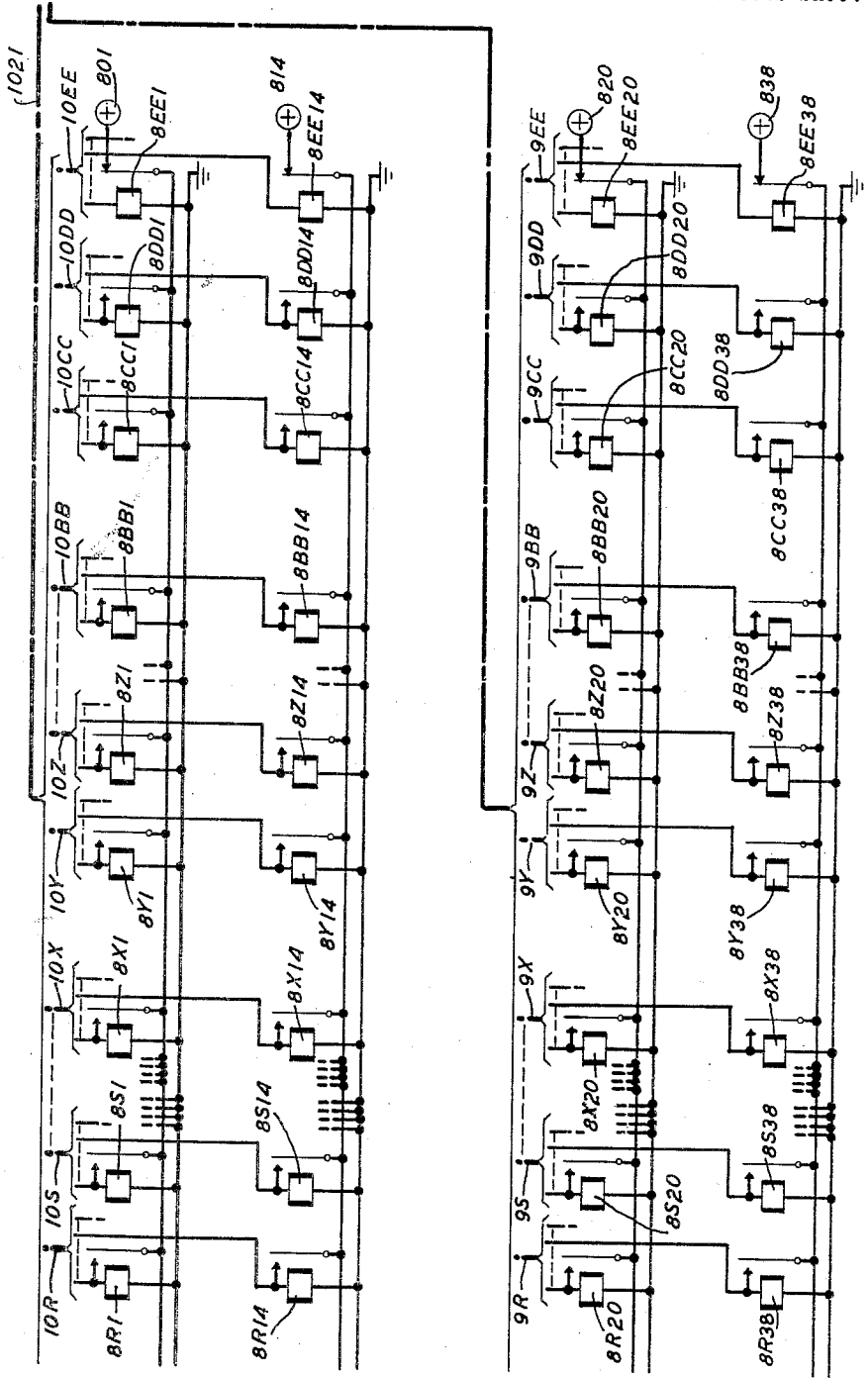
Figure 9:
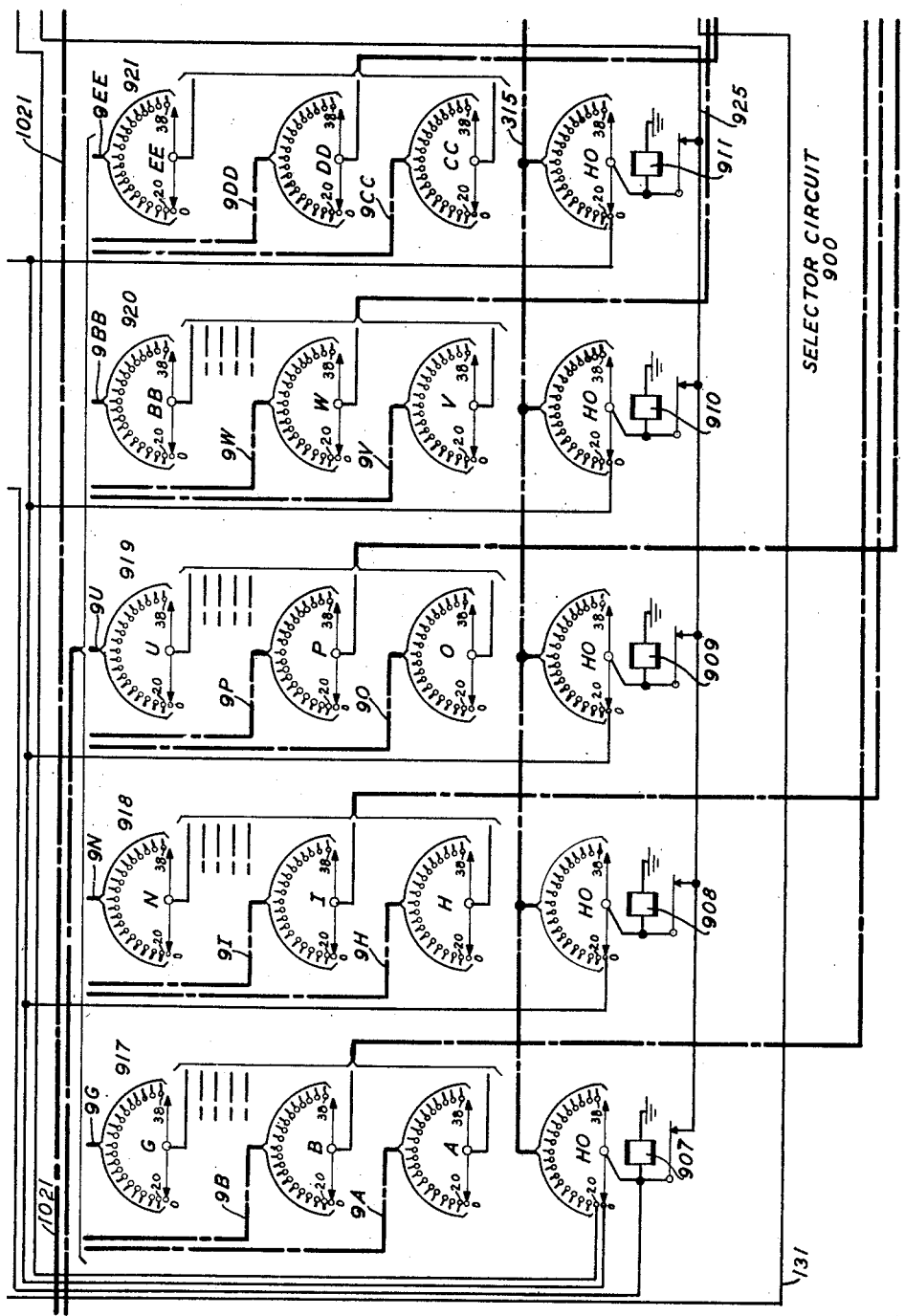
Figs. 9 and 10 illustrate the selector circuit of the present invention.
Figure 10:
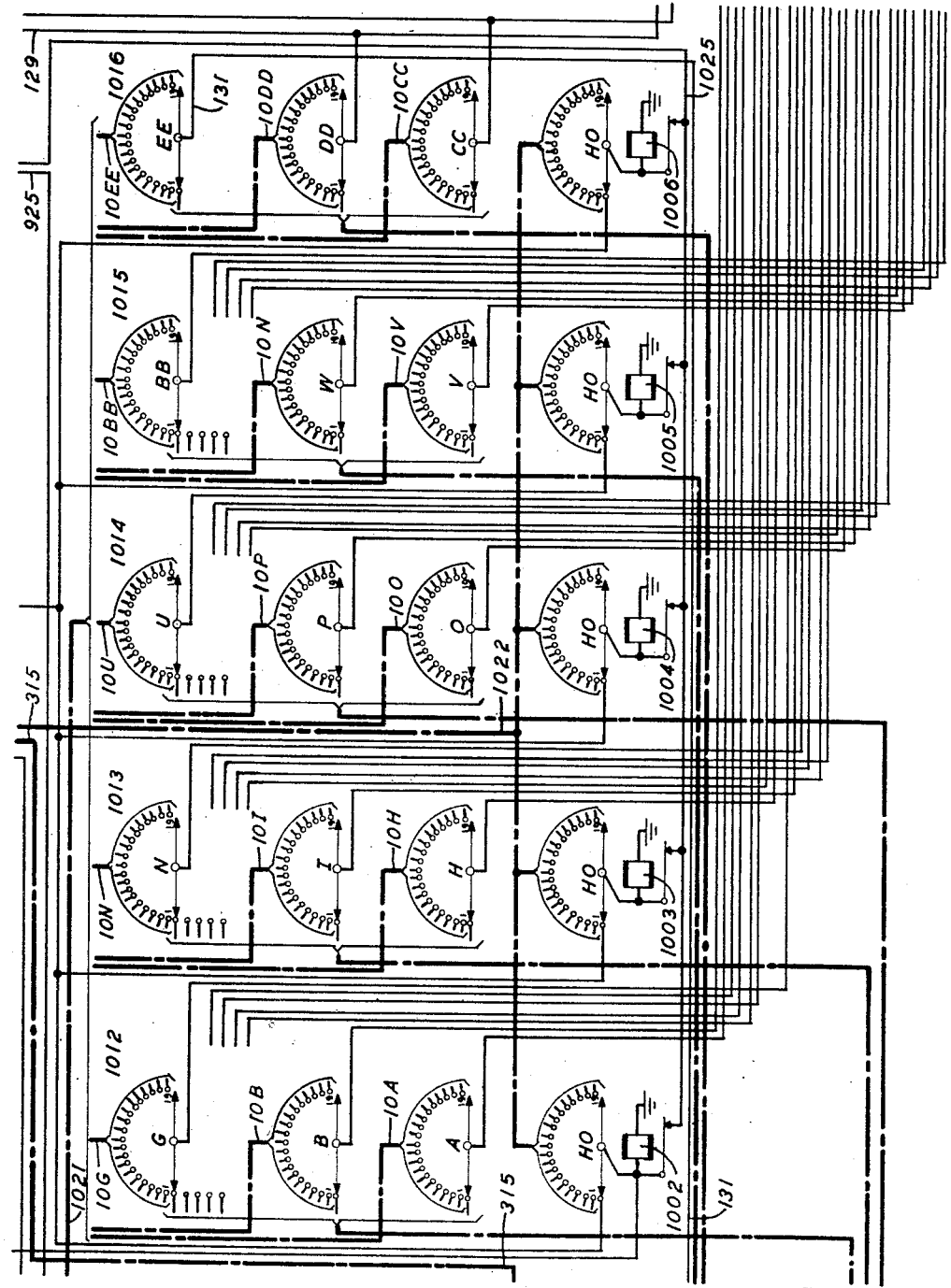
Figure 11:
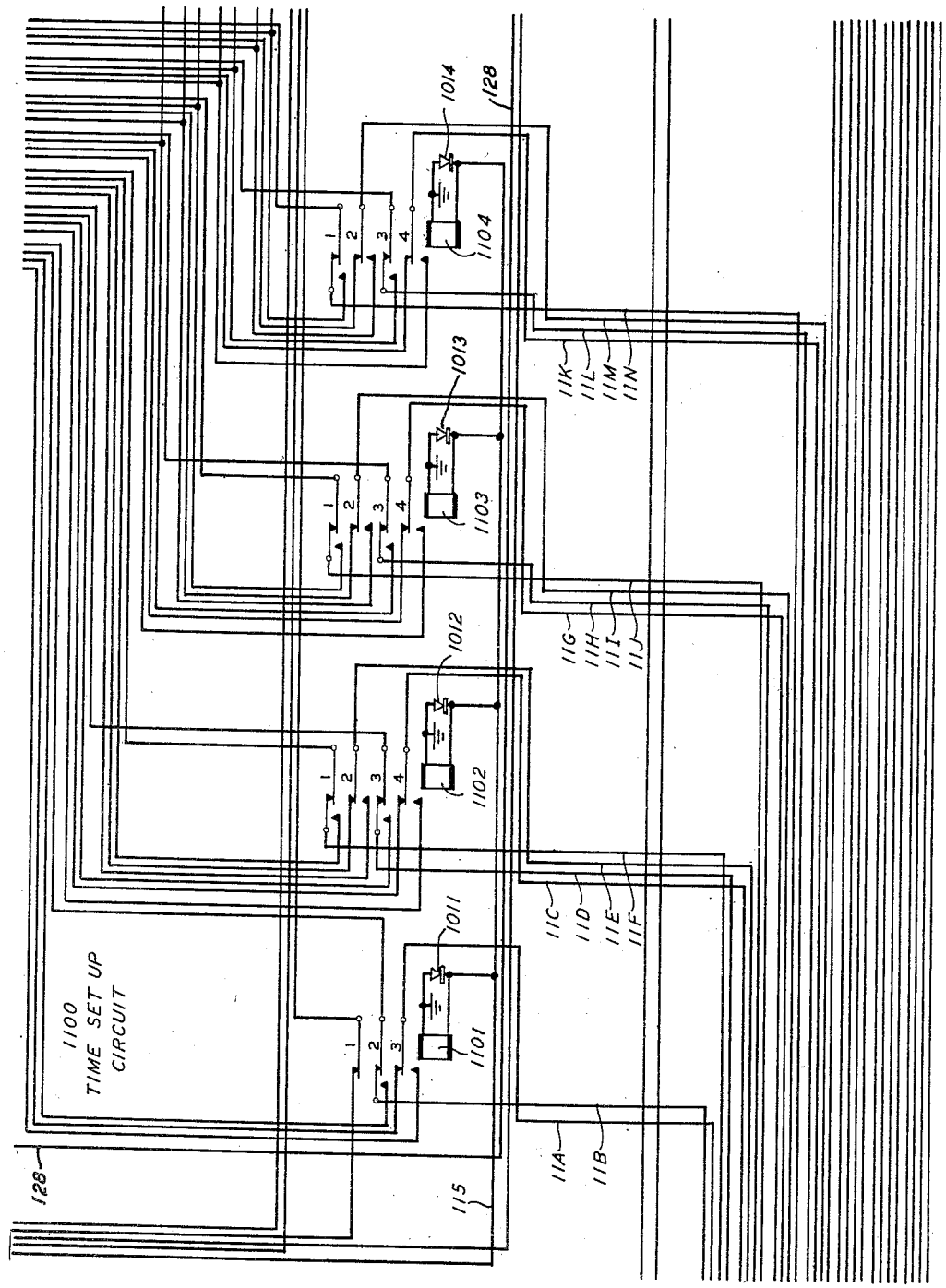
Fig. 11 illustrates the time setup circuit of the present invention.
Figure 12:
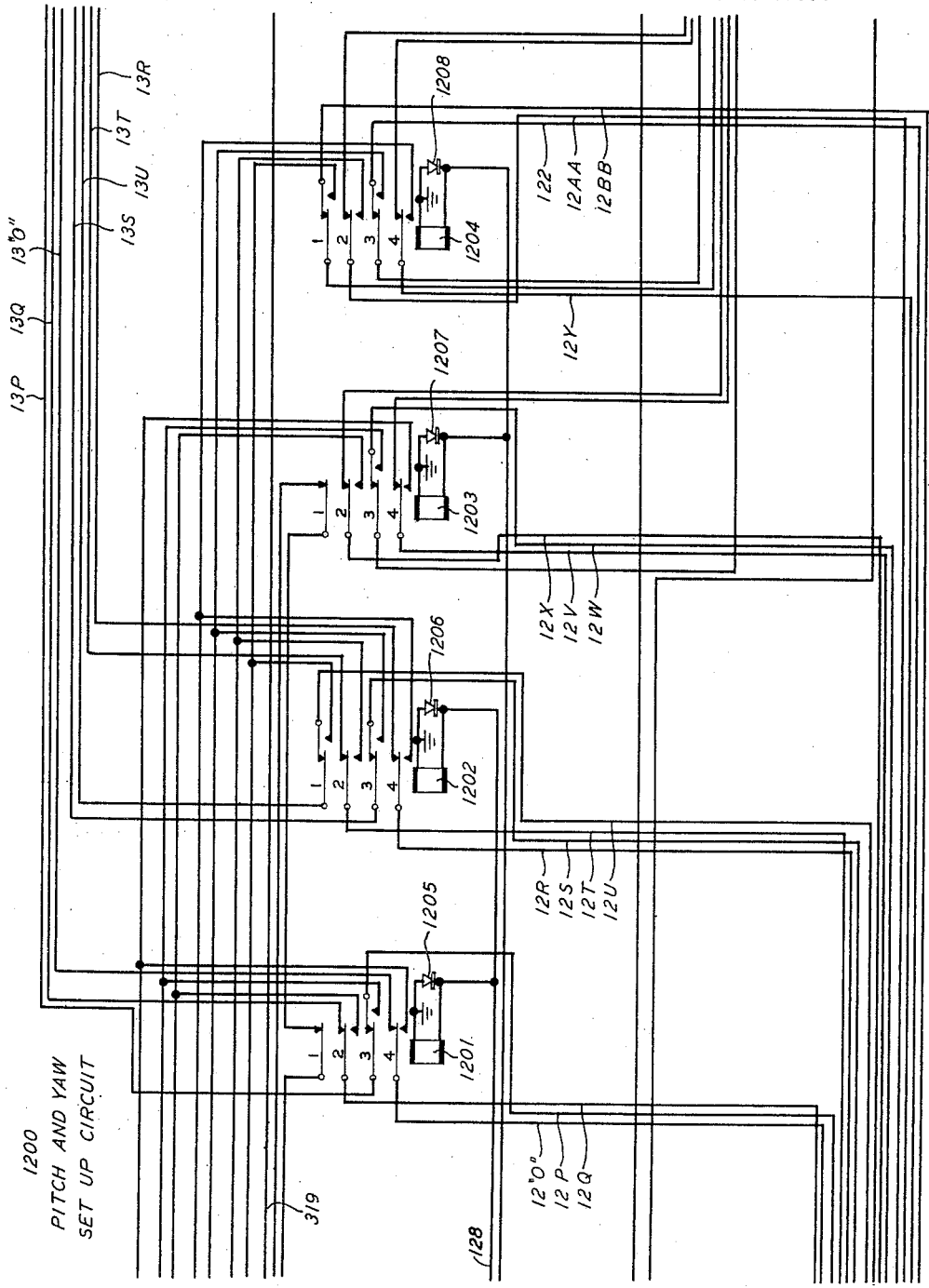
Fig. 12 illustrates the pitch and yaw setup circuit of the present invention.
Figure 13:
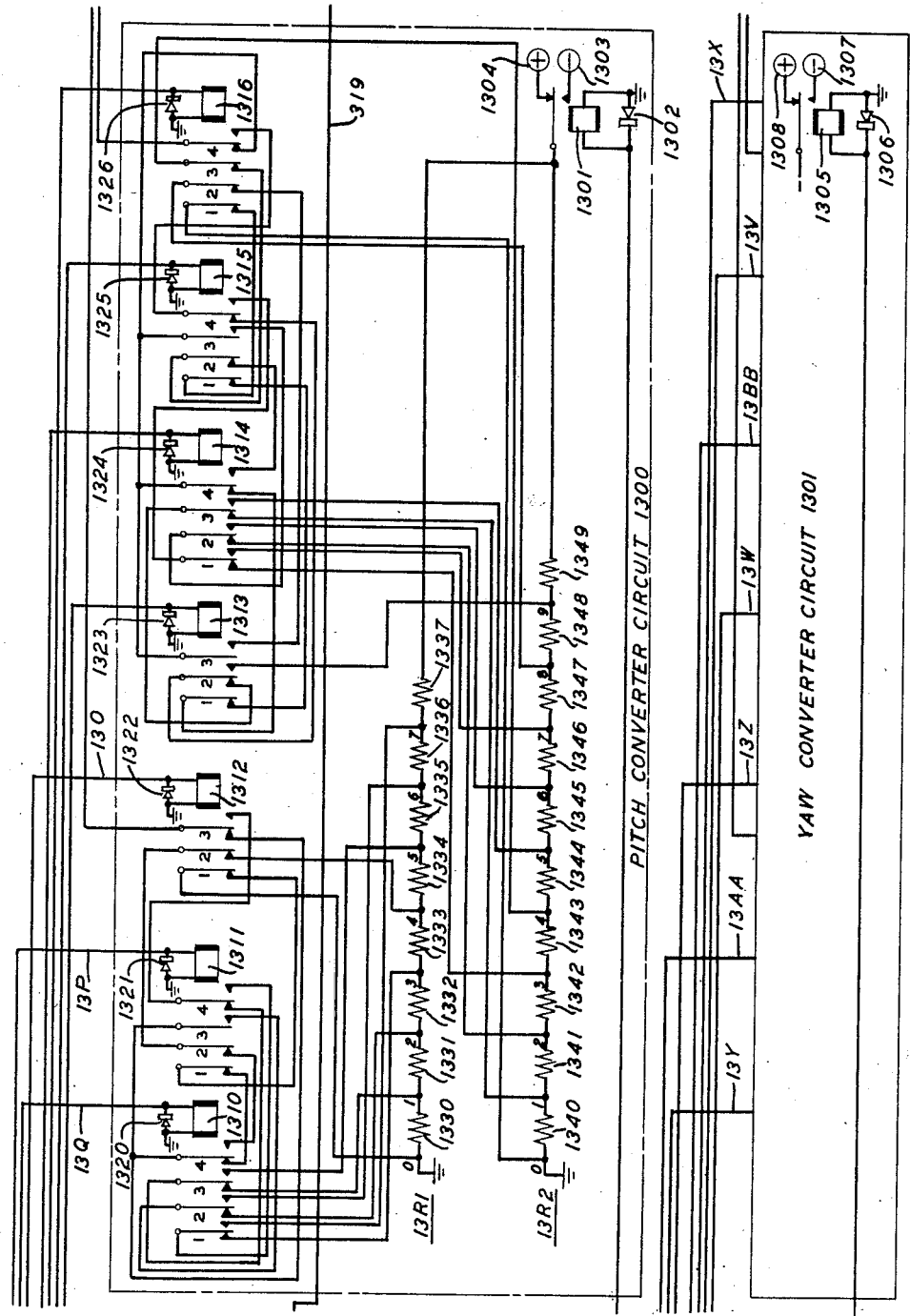
Fig. 13 illustrates the pitch convertor circuit and the yaw convertor circuit of the present invention.
Figure 14:
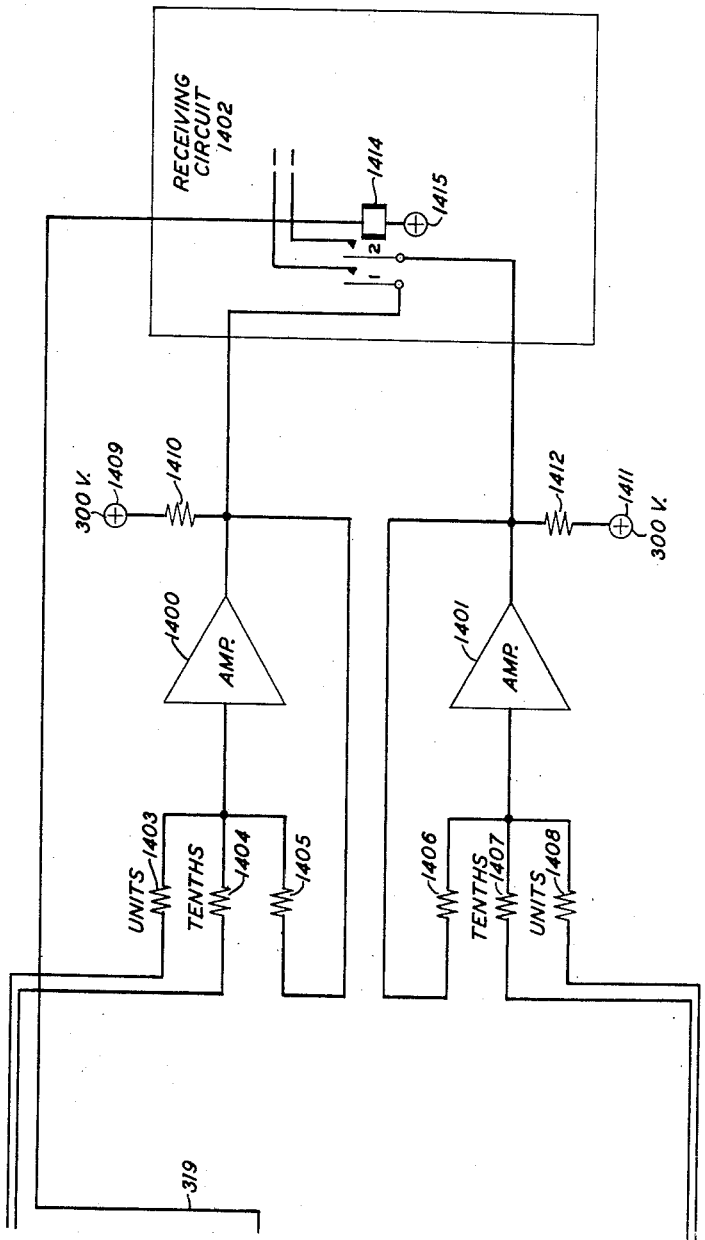
Fig. 14 illustrates the output amplifiers and receiving circuit of the present invention.
Figure 15:
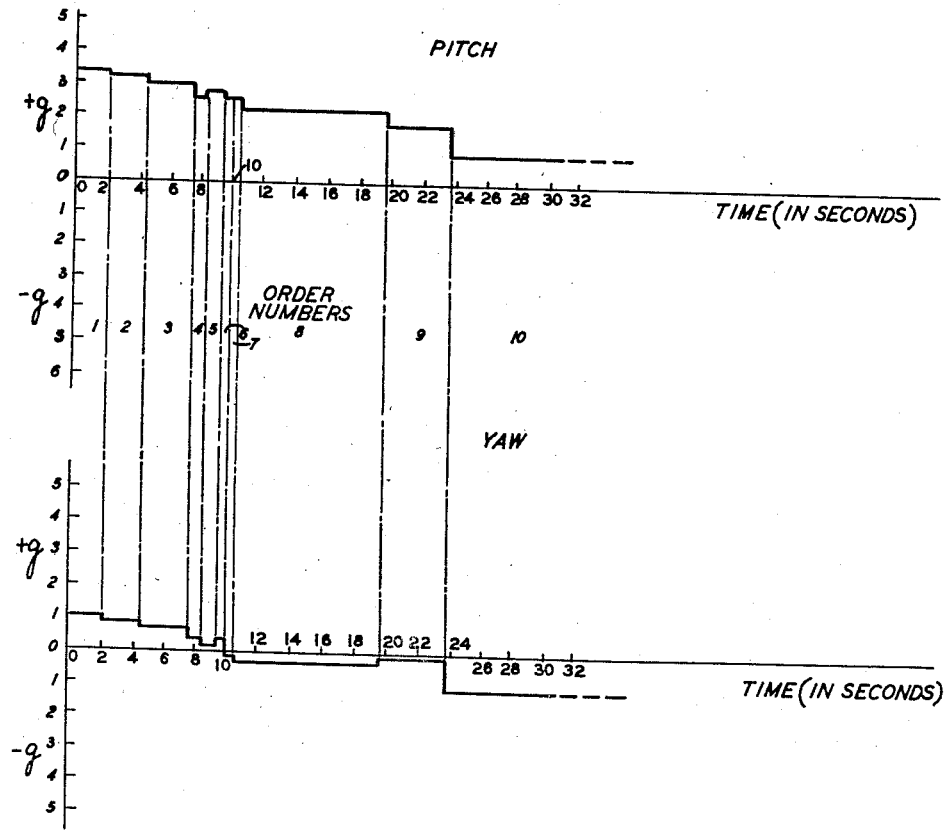
Fig. 15 illustrates the arrangement of Figs. 1 through 14.

The first one or two digits of the component designations indicate the figure of the detailed circuit, shown in Figs. 1–14, when arranged in accordance with Fig. 15, in which the component appears. For example, dial 101 is shown in Fig. 1 of the detailed circuit representation.

GENERAL DESCRIPTION

Figure 16:
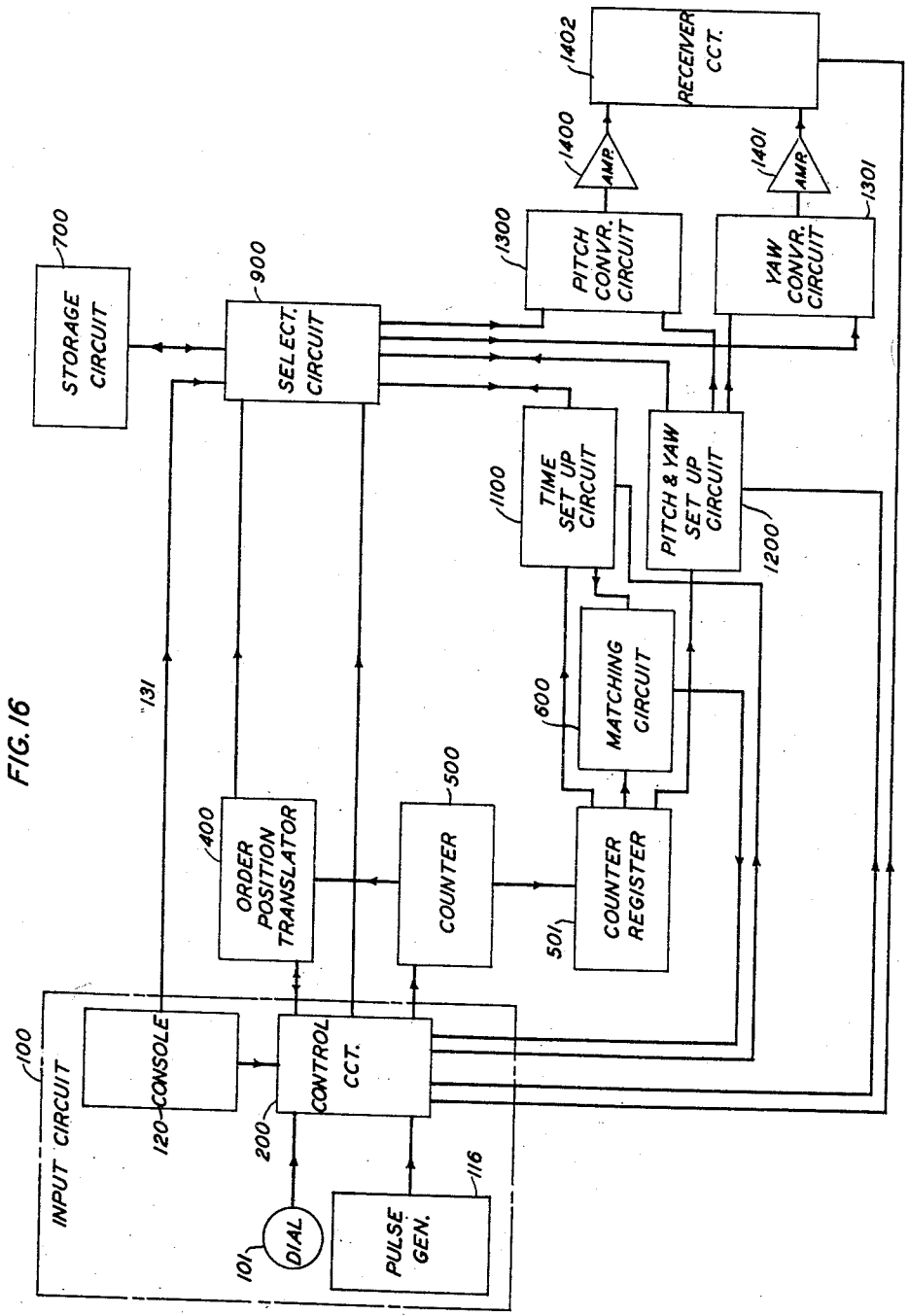
Fig. 16 is a box or functional diagram of the illustrative embodiment of the present invention.

Referring to Fig. 16, which is a functional diagram of the programmer of the present invention, an input circuit 100 is utilized to set up a program and control the transmission of the program to a receiving circuit 1402. The program consists of 38 orders or 38 changes in magnitude of a plurality of output potentials, with changes possible at intervals as small as one-tenth of a second. The output potential for each variable is, therefore, a step function, with the magnitude and duration of each step being determined by the programmer. The step functions shown in Fig. 17 are an illustrative program provided by the programmer.

In the illustrative embodiment described herein two variables, the pitch and the yaw of a simulated target are utilized. Each order of the program of 38 orders includes the pitch, the yaw and the time for terminating the order. The programmer functions to provide the pitch and yaw program, in accordance with a predetermined course of the simulated target, to the receiving circuit 1402. The course may be provided repeatedly or with desired changes in individual orders as is hereinafter described.

The input circuit 100 includes a modified telephone dial 101 with which the program information is entered. The dial 101 provides a number of pulses in accordance with the dialed digit: no pulse for the digit 0; one pulse for the digit 1; two pulses for the digit 2; etc. The dial 101 and a console 120, which is utilized as a steering and initiating control board, are connected to a control circuit 200. The console 120 has a plurality of control buttons, not shown in Fig. 16, which are manually operated. The console is referred to as being operated when one of its control buttons is operated.

Once a program has been decided upon, the console 120 and dial 101 are operated to store the information in a storage circuit 700. To store the pitch, yaw and time for an order number, the console 120 is operated to ready the control circuit 200. The control circuit 200 connects a four-digit binary decade counter 500 therethrough to the dial 101, and also readies an order position translator 400.

In the common representation of numbers, successive digits stand for coefficients of successive powers of 10. Counter 500 utilizes the binary system in which the coefficients are either "0" or "1" and are coefficients of successive powers of 2. In both cases, the value of the number is given by the sum of the series of terms involved, as shown in the following illustration:

|  | Scale of 10 (Decimal) | Scale of 2 (Binary) |
|---|---|---|
| Number | 1011 | 1011 |
| Equivalent | $1 \times 10^3 + 0 \times 10^2 + 1 \times 10 + 1 \times 10^0$ | $1 \times 2^3 + 0 \times 2^2 + 1 \times 2^1 + 1 \times 2^0$ |
| Decimal Value | 1011 | 11 |

Each of the decimal numbers 0–9 may be indicated by a four-digit binary number as follows:

| Decimal number: | Binary number |
|---|---|
| 0 | 0000 |
| 1 | 0001 |
| 2 | 0010 |
| 3 | 0011 |
| 4 | 0100 |
| 5 | 0101 |
| 6 | 0110 |
| 7 | 0111 |
| 8 | 1000 |
| 9 | 1001 |

The binary counter 500 utilizes four binary digits, as illustrated in the above table, in each decade or for each digit dialed at dial 101.

With the translator 400 readied and the counter 500 connected to the dial 101, the programmer is in a recording condition. The two-digit order number, from 01 to 38, is dialed and registered by counter 500. The counter 500 adds the dial pulses and supplies binary digital representations of the two dialed digits to a counter register 501 and to the order position translator 400. The counter register 501 which is also utilized, as is hereinafter described, to provide the pitch and the yaw information to the storage circuit 700, provides a visual indication of the dialed digits.

When the operator has checked the dial accuracy by observing the visual indication provided by register 501, the console 120 is operated to cause the translator 400 to supply a decimal indication of the order number to a selector circuit 900 and to the control circuit 200. The circuits 900 and 200, which have an order position for each order number, are set in accordance with the order number designation. A portion, or bank, of the storage circuit 700 is associated with each order position of the selector circuit 900. The selector circuit 900, in this manner, connects a bank of the storage circuit 700, which corresponds to the dialed order number, to a pitch and yaw setup circuit 1200 and to a time setup circuit 1100. The selector circuit 900 locks at the dialed order position, and when console 120 is released the circuit 200 and counter 500 are returned to normal. The dial 101 is thereafter utilized to dial the time, pitch and yaw information for the respective order position. The dialed information is supplied upon operation of the console 120 from the counter 500 through the counter register 501, and either the circuit 1200 or circuit 1100, through selector circuit 900 to the storage circuit 700. Depending on whether the time, pitch or yaw is dialed, buttons, not shown in Fig. 16, in console 120 are operated to operate either circuit 1100 or circuit 1200 to establish the connection from register 501 to circuit 700. After the operation of console 120 to store an item of information in circuit 700, its release resets circuit 200, counter 500 and register 501, but circuit 900 remains locked at its set order position. After the time, pitch and yaw have been stored for the order position, the console 120 is operated to reset circuit 900 under control of circuit 200. The storage circuit 700, which locks in the time, pitch and yaw information, is not affected when the register 501 or circuit 900 is reset.

Each of the 38 orders is set up in this manner with first the order number being dialed to set the selector circuit 900 and thereafter the time, pitch and yaw information dialed to the portion, or bank, of the storage circuit 700 selected by circuit 900.

The time, pitch and yaw stored for any order number may be readily changed by first setting circuit 900 at the desired order position and then operating console 120. The console 120 may be operated to provide an erase signal through lead 131 and the set selector circuit 900 to unlock the portion of the storage circuit 700 associated with the order position. After the time, pitch and yaw have been erased, the new time, pitch and yaw may be entered in a manner described above.

When the program is to be transmitted the console 120 is operated to set the circuit 200 in a transmit condition. The circuit 200 connects the pulse generator 116 through the control circuit 200 to the counter 500, serially arranges the four decades of counter 500, and provides a ready signal to circuit 1402. When the decades of the counter 500 are serially arranged, it can count up to 3999. In the illustrative embodiment of the present invention the maximum duration of the 38 order programs is 3999 seconds or 6 minutes and 39.9 seconds since the pulse generator 116 supplies ten pulses per second. When the circuit 1402 is readied, the pitch and yaw stored in circuit 700 for order position 1 are supplied through the circuit 900, set at its first order position, to the pitch converter circuit 1300 and the yaw converter circuit 1301. The circuits 1300 and 1301 convert, respectively, the binary coded representations of the pitch and yaw stored in circuit 700 to analogue potentials and supply them, respectively, through amplifiers 1400 and 1401 to the readied circuit 1402. The pitch and yaw analogue potentials for the first order number are supplied, in this manner, to the circuit 1402, until the order position of circuit 900 is changed.

During the time that the first order number, pitch and yaw are supplied to circuit 1402 the counter 500 provides a binary representation of the elapsed time to the counter register 501 which, in turn, supplies it to a matching circuit 600. The matching circuit 600 also receives the binary coded representation of the time registered for the first order number from storage circuit 700. This latter information is supplied to circuit 600 through the normal time setup circuit 1100 and the circuit 900. When a match occurs between the two sets of information supplied to circuit 600, it provides a stepping signal to the control circuit 200 and to the selector circuit 900 causing them to step to the next order position. The circuit 200 provides a locking potential to circuit 900, maintaining it locked at each step until circuit 200 is stepped. When the circuit 900 is stepped to the next or second order position, the time information supplied from the storage circuit 700 to the matching circuit 600 changes. The time now supplied to the circuit 600 is the time for ending the second order number instead of that for ending the first order. When the circuit 900 is stepped the pitch and yaw output potentials also change to provide thereby two step functions to circuit 1402.

In a similar manner the order numbers 3–38 are transmitted, with the pitch and yaw changing for each order number under control of the program stored in the circuit 700. When the thirty-eighth order has been transmitted and circuits 200 and 900 stepped again, the control circuit 200 releases to end the transmission of the program to circuit 1402. If the program is to be retransmitted, the console 120 may be operated to reset circuits 900 and 501, and counter 500, to return the circuit 200 to the transmit condition.

Further functions will become apparent upon consideration of the following detailed description.

DETAILED DESCRIPTION

Figs. 1–14, when arranged in accordance with Fig. 15, are a detailed circuit representation of an illustrative embodiment of the programmer of the present invention. The programmer provides to a receiving circuit 1402 a program of orders which are in the form of a plurality of step functions. The duration, magnitude and polarity of each step are controlled or determined by the programmer. The receiving circuit 1402 may be any sort of apparatus suitable for receiving variable output potentials, or step functions, from the programmer.

The programmer is controlled or operated by an input circuit 100 which includes the dial 101 and the console 120. The console 120 includes eleven control buttons 102 through 112 which are utilized together with the dial 101 to set up and to control the transmission of the program orders to the circuit 1402.

In the illustrative embodiment described herein the variables are the yaw and the pitch of a simulated target. A complete program consists of 38 orders or 38 automatic changes in pitch and yaw, with changes possible at intervals as small as one-tenth of a second.

Once a program has been decided upon, a sequence of operations is followed to set up or store the 38 orders in a storage circuit 700. Each of the 38 orders includes the magnitude of the pitch and the yaw and the time for terminating the order or for changing the pitch and yaw magnitudes.

The following is an illustrative example of a portion of a program shown in Fig. 17, which is provided to the circuit 1402: The time is in seconds and the pitch and yaw are in "g's" or are multiples of the acceleration of gravity.

| Order No. | Time (sec.) | Pitch (g) | Yaw (g) |
|---|---|---|---|
| 1 | 2 | +3.3 | +1.0 |
| 2 | 4.5 | +3.2 | +0.8 |
| 3 | 7.2 | +3.0 | +0.6 |
| 4 | 8.1 | +2.5 | +0.4 |
| 5 | 9.4 | +2.7 | +0.1 |
| 6 | 9.8 | +2.5 | +0.3 |
| 7 | 10.3 | +2.5 | −0.1 |
| 8 | 19.7 | +2.2 | −0.3 |
| 9 | 23.7 | +1.8 | −1.0 |
| 10 | 32.4 | +0.8 | −1.2 |
| 11 | 33.2 | +0.2 | −1.4 |
| 12 | 39.2 | −0.4 | −0.9 |
| 13 | 68.4 | −1.0 | −0.3 |
| 14 | 102.9 | −0.6 | +0.1 |
| 15 | 111.7 | −0.2 | +0.1 |

The sequence of operations, hereinafter described in detail, to set up one of the 38 orders, is as follows:

(1) Record button 102 is operated;
(2) The order number is dialed;
(3) The order set button 106 is operated;
(4) The time is dialed;
(5) The time button 107 is operated;
(6) The pitch magnitude is dialed;
(7) The plus pitch button 111 or the minus pitch button 110 is operated;
(8) The magnitude of the yaw is dialed;
(9) The plus yaw button 109 or the minus yaw button 108 is operated; and
(10) The programmer reset button 104 is operated.

Each of the steps in the above sequence for setting up an order is described in detail.

(1) *Record button 102 is operated*

Before the record button 102 in console 120 is operated it is necessary to operate a switch 118 to connect the 24-volt potential source 117 to one of the terminals of the record button 102. Once the switch 118 is closed it remains closed for the duration of the utilization of the programmer and is only returned to normal, disconnecting battery 117, when the programmer is not utilized.

When the record button 102 is operated, it connects the battery 117 through switch 118, to the control circuit 200 to set the control circuit 200 to a condition for recording or setting up an order. The control circuit 200 includes a plurality of relays 201 through 212 and 301 through 304 and a stepping switch 310. The switch 310 is an eight-bank stepping switch, only seven, 1–7, of which are shown, with each of the banks having 20 contacts and a contact brush. The eight brushes of switch 310 are stepped in unison under control of the stepping magnet 311 whenever the stepping magnet 311 is deenergized.

When the record button 102 is operated the relays 203, 204, 205, 209, 302 and 304 in the control circuit 200 are operated. Battery 117 is connected through switch 118 and the operated record button 102 to the winding of relays 203, 204 and 302 and through the normal armature 1 of relay 205 to the winding thereof. The record button 102 also connects battery 117 through the normal contactor of the order set button 106 and the normal contactor of the dial reset button 105 to the windings of relays 209 and 304. Each of the operated relays 203–5, 209, 302 and 304 in the control circuit 200 performs a function in readying the programmer for recording an order.

Relay 203 connects the input terminals A of the counter 500 to the contacts of the bank 1 of the stepping switch 310. The counter 500 is a four-digit counter having a hundreds, a tens, a units and a tenths section or decade. The hundreds section has two stages and each of the other sections have four stages. Each of the stages is essentially a bistable device which indicates one of two conditions. Such counters are well known in the art exemplified by the Patent 2,583,102, which issued to W. H. T. Holden on January 22, 1952, and the article on a four-tube counter decade by John T. Potter on page 110 of "Electronics," June 1944. The dial pulses are counted in the binary counter 500 and registered in a counter register 501 which is controlled by the counter 500. The output terminals 1, 2, 4 and 8 of the four sections of counter 500 are connected to the counter register 501 and from the hundreds and the tens sections also to an order position translator 400.

Each of the counter sections includes an input terminal A and a connect terminal B. The terminals A are connected through cable 214 to the armatures 1–4 of relay 203 and the terminals B are connected through cable 214 to the back contacts of armatures 1–4 of relay 203. When relay 203 is normal, terminal B of the tenths section is connected to the terminal A of the units section; terminal B of the units section is connected to the terminal A of the tens section; etc. With relay 203 normal, the sections of counter 500 are, in this manner, serially connected, so that at the count of ten by a section it provides an input pulse to the next section. When the tenths section, for example, counts to ten a pulse is provided to the units section. Relay 203 is normal, as is hereinafter described, when a program is being supplied by the programmer to the receiving circuit 1402. With relay 203 normal and pulses provided to the input terminal A of the tenths section, the counter 500 can count up to 3999.

When relay 203 is operated by the record button 102, the four sections of counter 500 are disconnected and are individually controlled by the dial 201. Terminals A of the four sections of counter 500 are connected, respectively, through cable 214, the operated armatures 1–4 of relay 203, and cable 213 to the contacts 0–3 of bank 1 of the stepping switch 310. The brush of bank 1 of switch 310 is connected through lead 122 to the contacts of armature 1 of dial 101, which is hereinafter described in detail. Bank 1 of switch 310 is utilized to steer the dial pulses, upon the operation of dial 101, first to the hundreds section of counter 500, then upon the second operation of dial 101 to the tens section, etc.

Relay 204 which operates upon the operation of the record button 102 is the record lockup relay. When relay 204 operates it locks to battery 117 through its operated armature 2, the normal contactor of the program reset button 104 and switch 118. Relay 204 also readies the order position translator 400 by connecting ground through its operated armature 3 thereto. The ground connection is provided to one side of the windings of each of six relays 401–6 in the translator 400. The other side of the windings of the relays 401–6 are connected, respectively, to the output terminals 1 and 2 of the hundreds section and output terminals 1, 2, 4 and 8 of the tens section of counter 500. The order position translator 400 is, in this manner, readied by the control circuit 200 and operated, as is hereinafter described, under control of the counter 500. The order position translator 400 functions, as is also hereinafter described, when the order set button 106 is operated, to provide a decimal indication of the dialed order number to the selector circuit 900.

Relay 205, which is operated by button 102, provides an indication that the battery 117 has been connected to the control circuit 200, and locks through the contacts of its operated armature 1 to battery 117. When relay 205 operates, it removes the battery 117 from a power-out lamp 114 and connects it through its operated armature 2 to a power-on lamp 113. A temporary interruption of the 24-volt supply source 117, which is equivalent to opening switch 118, will cause relay 205 to release extinguishing lamp 113 and reenergizing lamp 114 to provide an indication of the interruption. The information which is stored in the programmer would then be checked by the operator. Relay 205 remains operated until switch 118 is opened or a power failure at source 117 occurs.

At each successive dialing it is necessary to bring the stepping switch 310 to its home or 0 position. This is accomplished by the operation of relay 209. When relay 209 operates, responsive to the operation of button 102, it causes the repeated operation and release of the stepping magnet 311 of the switch 300 until the home or 0 contact position is reached. When relay 209 operates, it extends its operating path through its operated armature 4, the normal armature 3 of relay 207, the normal armature of the stepping magnet 310, the normal armature 3 of dial 101 and lead 312 to the winding of the stepping magnet 311. When the stepping magnet 311 operates, it opens its operating path through its armature causing it to release and reestablish its operating path. The stepping switch 310 steps, in this manner, each time the stepping magnet 311 releases until it reaches contacts 19. When the stepping switch 310 reaches contacts 19, the winding of relay 201 is connected through contact 19 of bank 7 of the switch 310, the normal armature 2 of relay 202, the serially connected normal armatures 1 of relays 1203 and 1201 in the pitch and yaw setup circuit 1200, the normal armature 1 of relay 1101 in the time setup circuit 1100, the normal button 105, the normal button 106, the operated record button 102 and the closed switch 118 to the battery 117.

When relay 201 operates, it connects the battery 117 through the closed switch 118, the operated button 102 and the operated armature 2 of relay 201 to the winding of relay 202 causing it to operate. Relay 201 also resets the counter 500. Relay 201 resets the counter 500 by providing a short circuit through its operated armature 1 across the reset terminals R of counter 500. The duration of the short-circuit connection is brief since, as is hereinafter described, relay 201 releases upon the operation of relay 202. When relay 202 operates, it opens the operating path through its armature 2 for relay 201 causing it to release. Relay 202 also locks over a path through the contacts associated with its operated armature 2 to the battery 117, and releases at its armature 1 relays 209 and 304. The locking path for relay 202 is through the contacts associated with its operated armature 2, the serially connected normal armature 1 of relays 1203, 1201 and 1101, the normal buttons 105 and 106, the operated armature 2 of relay 204, the normal button 104 and switch 118 to battery 117. When relay 209 releases, it releases at its armature 4 the stepping magnet 311 which causes the switch 310 to step to its home or 0 contact position.

Relay 304, which is operated upon the operation of the record button 102, is a programmer reset relay 304 which is also operated during step (10), mentioned above, of the recording sequence, upon the operation of the reset button 104. The programmer reset relay 304 does not perform any function at this time, when the record button 102 is operated, except to provide a momentary short circuit through its operated armature 2 across the reset terminals R of the counter 500. The contacts associated with armature 2 of relay 304 are make-before-break contacts so that a connection is momentarily provided through the armature 2 before it completes its operation. The counter 500 is reset, as described above, also under control of the relay 201.

Relay 302, which is operated upon the operation of the record button 102, provides ground through its operated armatures 2 and 3, respectively, to the windings of relays 210 and 211. The ground connection only readies operating paths for relays 210 and 211. Relays 210 and 211 are operated, as is hereinafter described, under control of the selector circuit 900 during step (3) of the recording sequence, when the order set button 106 is operated.

When the record button 102 is released, relays 202-5 and 302 remain operated through the locking path from battery 117, the closed switch 118, the programmer reset button 104 and the operated armature 2 of relay 204. As soon as the record lockup relay 204 operates, as described above, it provides this locking path for itself and relays 202, 203 and 302.

To briefly recapitulate, when the record button 102 is operated the relays 202-5, 209, 302 and 304 in the control circuit are operated and the stepping switch 310 is returned to its 0 contact position. Circuit 200 functions to connect dial 101 through contact 0 of bank 1 of switch 310 to terminal A of the hundreds section of counter 500 and to ready the translator 400 for operation under control of counter 500. At the end of the sequence of operations, occurring due to the operation and release of the record button 102, only relays 202-5 and 302 remain operated.

(2) *The order number is dialed*

The recording dial 101 is a modified telephone dial which when moved from its rest position operates its lower set of springs, or armatures 2 and 3. When the dial is released its upper set of springs, or armature 1, opens and closes a number of times determined by the dialed digit; once for the digit 1, twice for the digit 2, etc. and 0 for the digit 0. At the end of the dial return armatures 2 and 3 transfer back or release. More specifically, when the recording dial 101 is moved from its rest position in a clockwise direction, the armature 2 operates to apply or connect the 24-volt potential source 117 through lead 312 to the winding of the stepping magnet 311. Switch 310, however, does not step until source 117 is disconnected and magnet 311 releases. When the dial is released, armature 1 opens to remove the short circuit across a capacitor 121. The capacitor 121, which is connected to battery 117 through resistor 119 and switch 118, charges to the potential of battery 117 when the short-circuiting path through armature 1 opens. The digit pulses are provided upon the operation and release of armature 1, when the dial is released, by charging and short-circuiting the capacitor 121. The dial pulses from capacitor 121 are supplied through lead 122 and the brush of bank 1 of switch 310 to the counter 500.

At the end of the dial return armature 2 of dial 101 releases opening the operating circuit for the stepping magnet 311 causing it to release and step switch 310. The brush of bank 1 of switch 310 thereupon provides a connection from the dial 101 through contact 1 of bank 1 of switch 310 to the terminal A of the tens section of counter 500.

With the dial 101 connected to the tens section or decade of counter 500, the second digit of the order number is dialed. When the dial 101 returns to normal for the second time the switch 310 is stepped to contacts 2 but performs no function thereat since the order number has only two digits.

If the desired order number or position is 14, the digit 1 and then the digit 4 are dialed. When the digit 1 is dialed, a single pulse is provided from capacitor 121 through lead 122, contact 0 of bank 1 of switch 310, cable 213, the operated armature 1 of relay 202 and cable 214 to the input terminal A of the hundreds sections of counter 500. The hundreds section of counter 500 counts to 1 and provides a positive operating potential from its output terminal 1 to the counter register 501 and to the order position translator 400. There are four output terminals (1, 2, 4 and 8) for each of the tenths, units and tens sections of the counter 500 but only two output terminals (1 and 2) from the hundreds section. The hundreds section having only two stages can only count up to 4 whereas the others with four stages can count up to 10. When the digit 1 is dialed the output of the hundreds section of counter 500 is 01 and when the digit 4 is dialed the output of the tens section is 0100. A potential is provided only from the terminal 4 of the tens section and from terminal 1 of the hundreds section. If the terminals 1, 2, 4 and 8 of the tens section of the counter 500 in Fig. 5 were shown in the reverse order, with the least significant digit last, the potentials provided therefrom would correspond with the binary notation. The counter 500 provides the binary digital information to the counter register 501 and translator 400.

The register 501 consists of 14 relays 502-7 and 601-8 and 14 indicating lamps 512-17 and 611-18 which are individually associated with the 14 output terminals of the counter 500. The relays 502-7 and 601-8 in the counter register 501 are arranged in four groups designated hundreds, tens, units and tenths which are associated individually with the four sections of the counter 500. The relays 502-7 and 601-8 are also connected, respectively, to the negative potential sources 522-27 and 621-28.

The order position translator 400, as described above, consists of six relays 401-6 which are associated individually with the output terminals of the hundreds and the tens sections of the counter 500. The order position translator 400, which was readied by the control circuit 200, is utilized to translate the binary digital information provided from the counter 500 to a decimal notation suitable for utilization in setting the selector circuit 900.

With a positive potential at the output terminal 1 of the hundreds section of counter 500, relays 503 and 401 in the counter register 501 and order position translator 400, respectively, are operated. The positive operating potential at output terminal 4 of the tens section of counter 500 causes the operation of relay 505 in the counter register 501 and relay 405 in the order position translator 400.

After the order number has been dialed, therefore, relays 503 and 505 in the counter register 501 and relays 401 and 405 in the order position translator 400 are operated. The operating path for relay 401 is from terminal 1 of the hundreds section of counter 500 through the winding of relay 401 and the operated armature 3 of relay 204 to ground. The same ground connection is provided to the winding of relay 405 which is connected to the output terminal 4 of the tens section of counter 501. The relays 401-6 may be operated from closed contacts, not shown, on relays 502-7 instead of directly from counter 500 as described above. The order position translator 400 is utilized to translate the binary coded order number, supplied from the counter 500, to a decimal indication, and to supply a potential in accordance therewith to contacts on the switch 310. The relays 401 and 402 are utilized to provide an indication of the tens digit of the order number and the relays 403-6 are utilized to provide an indication of the units digit. The leads 0, 10, 20 and 30 in cable 408 are connected from the contacts of relays 401-2 to contacts of the switch 310. As is hereinafter described, lead 0 is energized if the order number is from 1 to 9; lead 10 is energized if the order number is from 10 to 19; lead 20 is energized if the order number is from 20 to 29; and lead 30 is energized if the order number is from 30 to 38.

With an order number of 14, a path is readied from the open contact of relay 301, through the normal armature 1 of relay 206, the operated armature 1 of relay 401, the normal armature 3 of relay 402 and lead 10, to contact 10 of bank 2 of switch 310. The mating contact of relay 301 is connected to battery 117 through the operated contact 2 of relay 204. The order position translator 400 functions in this manner to ready a path for connecting battery 117 to contact 10 of bank 2 of switch 310.

The counter register 501 is utilized, as is hereinafter described, for registering the time, the pitch and the yaw after the order position has been set. The lamps 512-7 and 611-8 provide a visual indication of the dialed digits. With relays 503 and 505 operated, paths are provided from battery 650 to lamps 513 and 515. Lamp 513 is connected through the serially connected normal armatures of relays 533-7 and 631-8 to battery 650 and lamp 516 is connected through the serially connected armatures of relays 536-7 and 631-8 to battery 650. The relays 532-7 and 631-8 are part of a matching circuit 600 which is hereinafter described in detail. The dialing accuracy may be checked by the operator by viewing the lamps 512-7 and 611-8 in the register 501 before proceeding with the next step in the sequence for setting up an order.

If the wrong digits have been dialed the operator operates the dial reset button 105 to reset circuit 200, counter 500, and register 501. When the dial reset button 105 is operated it opens the locking path for relay 202 causing it to release and return switch 310 to its home position. The locking path for relay 202 is through the contacts associated with its operated armature 2, the serially connected armatures 1 of relays 1203, 1201 and 1101, the normal dial reset button 105, the normal order set button 106, the operated armature 2 of relay 204, the normal program reset button 104 and switch 118 to battery 117. When relay 202 releases it closes through its armature 1 operating paths for relays 209 and 304. When relay 209 operates it extends its operating path through its operated armature 4 through the armature of magnet 311 to its winding. The switch 310 is stepped in this manner from contacts 2 to contacts 19. When the switch 310 reaches contacts 19, the brush of bank 7 completes a path from battery 117 to the winding of relay 201 causing it to operate.

When relay 201 operates, it closes at its armature 1 a short-circuit path across the reset terminals R of counter 500 and closes an operating path through its armature 2 for relay 202. Relay 202 releases relays 209 and 304 opening the stepping path for magnet 311 causing it to release and step the switch 310 to its home position. When counter 500 is reset it in turn resets the register 501.

With the circuit 200, counter 500 and register 501 reset, the correct digits are dialed and checked. When the dialing is accurate, the order set button 106 is operated.

(3) *The order set button 106 is operated*

After the indication of the dialed digits has been checked by the operator by observing the indicating lamps 512-7 and 611-8 in counter register 501, the order set button 106 in console 120 is operated. The operation of the button 106 causes switch 310 to step and translator 400 to supply a decimal indication of the order number to contacts of switch 310. The decimal indication from the translator 400 functions as a stopping potential for switch 310.

When the button 106 is operated, it opens the locking path for relay 202 causing it to release. The locking path for relay 202, as described above, is through the contacts associated with its operated armature 2, the serially connected normal armatures 1 of relays 1203, 1201 and 1101, the normal buttons 105 and 106, the operated armature 2 of relay 204, the normal button 104 and switch 118 to battery 117.

When the button 106 is operated, it also provides a connection from battery 117 through the closed switch 118, the program reset button 104, the operated armature 2 of relay 204, the operated order set button 106 and lead 123 to the winding of relay 301 causing it to operate. When relay 301 operates, it completes the path readied by translator 400 to contact 10 of bank 2 of switch 310. The path from battery 117 is through switch 118, the button 104, the operated armature 2 of relay 204 through the contacts associated with the operated armature of relay 301, the normal armature 1 of relay 206, the operated armature 1 of relay 401, the normal armature 3 of relay 402 and lead 10 to contact 10 of bank 2 of switch 310. Relay 401 is operated, as described above, when the tens digit of the order number is 1 or 3. When the tens digit of the order number is 2 or 3, relay 402 is operated. With only the relay 401 operated, the connection from battery 117 through the contacts of relay 301 is, as described above, to contact 10 of bank 2 of switch 310.

When relay 301 operates, it also extends the connection from battery 117 through the normal armature 4 of relay 209, the normal armature 3 of relay 207, the normal armature of magnet 311, the normal armature 3 of dial 101 and lead 312 to the winding of the stepping magnet 311 causing the magnet 311 to operate. When the magnet 311 operates it opens at its armature its own operating path causing it to release. The brushes of switch 310 advance in this manner, step-by-step, until contact 10 is reached. When the brush of bank 2 of switch 310 reaches contact 10 the connection from battery 117 through translator 400 to contact 10 of bank 2 is extended through the brush of bank 2, the normal armature 3 of relay 206 and resistor 216 to the winding of relay 206 causing it to operate. The winding of relay 206 is shunted to ground through the capacitor 215 which functions to slow down the operation of relay 206 when the tens digit contact is reached. The relay 206 is slowed down in this manner to prevent it from operating before the magnet 311 can operate to hold the tens position at contact 0. If relay 206 operates quickly the switch 310 may advance to the units regisration condition at contact 1 before being held at the tens position at contact 0.

When relay 206 operates, it locks to battery 117 through resistor 216, the contacts of its operated armature 3, the contacts of the operated armature of relay 301, the operated armature 2 of relay 204, the program reset button 104 and switch 118. Relay 206 functions to open the path from battery 117 through its normal armature 1 to the contacts of relays 401 and 402 and to transfer it to the contacts of relays 403-6. The potential at contact 10 of bank 2 of switch 310 is, in this manner, removed to allow the stepping magnet 311 to release and continue to step the switch 310. The connection from battery 117 through the contacts associated with the operated armature of relay 301 is transferred by relay 206 through the contacts of its operated armature 1, the normal armature 4 of relay 403, the operated armature 4 of relay 405, the normal armature 2 of relay 404, the normal armature 3 of relay 403 and lead 4 of the group of leads, or cable 407, to the contacts 4 and 14 of bank 2 and to contacts 24 and 34 of bank 3 of the stepping switch 310. Cable 407 consists of leads 1-9 which are connected from contacts of relays 403-6 to contacts on banks 2 and 3 of switch 310, and lead 0 which is connected to the winding of relay 208 in circuit 200. The energization of lead 4 of cable 407 indicates, of course, that the units digit of the order number is 4.

The switch 311 continues to step from contacts 10 until it reaches contacts 14. When the brush of bank 2 reaches contact 14 the connection from battery 117 to contact 14 is extended through the brush, the normal armature 3 of relay 209, the normal armature 2 of relay 207, lead 124 and lead 312 to the winding of the stepping magnet 311 locking it operated. The potential provided through lead 4 of cable 407 from translator 400 therefore functions as a stopping potential for switch 310. The potential provided through the contacts of relays 401 and 402, in this manner, determines the tens digit and through the contacts of relays 403-6 determines the units digit of the stopping position of switch 310. When contact 14 is reached, an operating path is also provided from contact 14 of bank 2 of switch 310, through the brush of bank 2 and the operated armature 2 of the slow operating relay 206 to the winding of relay 208 causing it to operate.

When the relay 208 operates, a connection is provided from battery 117 to the brush of bank 4 of switch 310 and also to the selector circuit 900. The connection to the brush of bank 4 of switch 310 from battery 117 is through switch 118, the normal contactor of button 104, the operated armature 2 of relay 204, the normal contactor of button 106, the operated armature of relay 208, the normal armature 1 of relay 207, and the normal armature 2 of relay 402. The brush of bank 4 is also connected through lead 1025 to the armatures of the stepping magnets 1002–6 to the windings thereof. Relay 402, as described above, would be operated for numbers greater than 19 to provide a connection from battery 117 to the brush of bank 5 instead of bank 4 of switch 310 and to the stepping magnets 907–11 instead of the stepping magnets 1002–6. In this manner, a stepping potential is provided to the five stepping magnets 1002–6 in circuit 900 for order numbers 1 to 19 and to the stepping magnets 907–11 in circuit 900 for order numbers 20 to 38. As is hereinafter described, the potential provided to the brush of bank 4 for order numbers 1–19 and to the brush of bank 5 for order numbers 20–38 functions as a stopping potential for the selector circuit 900.

The selector circuit 900 has ten selector switches 1012–16 and 917–21. Each of the switches 1012–15 and 917–20 has eight banks of contacts and the switches 1016 and 921 have four banks of contacts. The switches 1012–16 are utilized, as indicated above, for order numbers from 1 to 19 and the switches 917–21 are utilized for order numbers from 20 to 38.

Each of the switches 917–21 and 1012–16 has a plurality of banks which provide connections to the storage circuit 700 and also one bank HO through which it is held at an order position. Similarly designated contacts of the banks HO of switches 907–11 are interconnected and similarly designated contacts of the banks HO of switches 1012–16 are interconnected. For example, contact 14 of bank HO of switch 1012 is connected to contacts 14 of banks HO of switches 1013–16. The contacts of banks HO of switches 1012–16 are also connected through cable 1022, respectively, to the similarly designated contacts 1–19 of bank 4 of switch 310 in the control circuit 200. The contacts 20–38 of bank 5 of switch 310 are connected in a similar manner through cable 315 to the contacts 20–38 of banks HO of switches 917–21. The brushes of banks HO of switches 917–21 and 1012–16 are connected respectively through the stepping magnets 907–11 and 1002–6 to ground. The stepping magnets 907–11 are also connected through their respective normal armatures and lead 925 to the brush of bank 5 of switch 310 and also to the make contact associated with armature 2 of relay 402 in the translator 400. The stepping magnets 1002–6 are also connected, as described above, through their respective normal armatures and lead 1025 to the brush of bank 4 of switch 310 and to armature 2 of relay 402. Depending upon the condition of relay 402 a connection is provided to either lead 925 or lead 1025 from battery 117.

For the order number 14, as described above, relay 401 is operated and relay 402 is normal so that an operating path is provided through lead 1025 for the stepping magnets 1002–6.

The stepping magnets 1002–6 operate and open their operating paths at their armatures causing themselves to release. In this manner the switches 1012–16 are stepped to contacts 14. When battery 117 is connected to the stepping magnets 1002–6 it is also, as described above, connected to the brush of bank 4 of switch 310. With the switch 310 set at contacts 14, the connection from battery 117 is extended through contact 14 of bank 4 of switch 310 and cable 1022 to contacts 14 of banks HO of switches 1012–16. When the switches 1012–16 are stepped to contacts 14, the locking potentials at contacts 14 of banks HO lock magnets 1002–6 in their operated condition. When locking potential is applied through the brush of bank HO of switch 1012 it is also extended to the winding of relay 211 causing it to operate. The operating path for relay 211 is from ground through the operated armature 3 of relay 302, the winding of relay 211, and the brush of bank HO of switch 1012 to contact 14 thereof. Relay 211 is a holding relay which holds the switches 1012–16 at the order number position. The magnets 1003–6 are locked operated over a path through contacts 14 of their banks HO, contact 14 of bank HO of switch 1012, the brush of bank HO of switch 1012 to the winding of magnet 1002. The winding of magnet 1002 is also connected through the operated armature of relay 211, the contacts associated with the normal armature of relay 301, the operated armature 2 of relay 204, the normal contactor of button 104 and switch 118 to the battery 117. In this manner the stepping switches 1012–16 are locked at contacts 14 and remain thereat when, as is hereinafter described, switch 310 is returned to normal opening the path through cable 1022.

At any contact position the selector circuit 900 provides a connection to the windings of 31 storage or memory relays in the storage circuit 700. With 38 order numbers, and 31 relays for each order number the circuit 700 has 38×31, or 1178 relays in all. The contacts 14, for example, of banks A–G of switch 1012 are connected through cable 10G, which is part of cable 1021, to the relays 7(A–G)1. The designation of each relay includes the figure number in which it appears, the bank of contacts in circuit 900 to which it is connected, and the contact number in the bank. Relay 7A14, for example, appears in Fig. 7 and is connected through cable 10A, to contact 14 of bank A of switch 1012.

To briefly recapitulate the sequence of operations for step (3), when the order set button 106 is operated, it causes the operation of the relay 301 in the control circuit 200. When relay 301 operates, it connects a stopping potential under control of the translator 400 to contact 10 of bank 2 of the stepping switch 310 and causes the operation of the release of the magnet 311 until contact 10 is reached. When the switch 310 steps to contacts 10 an operating path is completed for slow operating relay 206 which opens the stopping potential path to contact 10 of bank 2 and closes a path for locking potential to contact 14 of bank 2 of switch 310. The potential to contact 14 is under control of the units relays 403–6 in the translator 400. When the stopping potential is transferred to contact 14, the magnet 311 is allowed to release and reoperate until contact 14 is reached. When contact 14 is reached, the relay 208 is operated to connect battery 117 to the brush of bank 4 of switch 310 and also through lead 1025 to step the switches 1012–16 to contacts 14. When the switches 1012–16 reach contacts 14, relay 211 in the control circuit 200 is operated to lock the switches 1012–16.

When the order set button 106 is released, it in turn releases the relay 301 in circuit 200. The operating path for relay 301 is through lead 123, the operated button 106, the operated armature 2 of relay 204, the normal button 104 and switch 118 to battery 117. When relay 301 releases, it removes the locking potential from the stepping magnet 311 to allow the switch 310 to return to its home position and causes the release of relay 206. The locking path for the magnet 311 is through lead 312, lead 124, the normal armature 2 of relay 207, the normal armature 3 of relay 209, the brush of bank 2 of switch 310, contact 14 of bank 2 of switch 310, lead 4 of cable 407, the normal armature 3 of relay 403, the normal armature 2 of relay 404, the normal armature 4 of relay 405, the operated armature 4 of relay 403, the contacts associated with the operated armature 1 of relay 206, the contacts associated with the operated armature of relay 301, the operated armature 2 of relay 204, the normal button 104, and switch 118 to battery 117. With the locking potential to contact 14 of bank 2 of switch 310 removed the magnet 311 is operated and released over its self-stepping path until contacts 19 are reached. The self-stepping path for magnet 311 is through lead 312, lead 127, the normal armature of magnet 311, the normal armature 3 of relay 207, the armature 4 of relay 209. Relays 209 and 304 are operated when the button 106 is released as their windings are connected through the normal armature 1 of relay 201, the serially connected normal armatures 1 of relays 1203, 1201 and 1101, the normal button 105, the normal button 106, the operated armature 2 of relay 204, the normal button 104, and switch 118 to battery 117. With relay 209 operated the self-stepping path from magnet 311 is through the operated armature 4 of relay 209 to battery 117 through the operating path of relay 209. In other words when relay 209 operates it extends its operating path to the magnet 311. Each time the magnet 311 operates it opens its operating path causing it to release and step the switch 310. When contacts 19 are reached, relay 201 is operated. The operating path for relay 201 is through contact 19 of bank 7 of switch 310, the brush of bank 7 of switch 310, the normal armature 2 of relay 202, the serially connected normal armatures 1 of relays 1203, 1201 and 1101, the normal button 105, the normal button 106, the operated armature 2 of relay 204, the normal button 104 and switch 118 to battery 117.

When relay 201 operates, it resets counter 500 and causes the operation of relay 202. The reset terminals R of counter 500 are short-circuited through the operated armature 1 of relay 201 and the operating path of relay 201 is through the operated armature 2 of relay 201, the operated armature 2 of relay 204, the normal button 104 and switch 118 to battery 117.

When relay 202 operates, it opens at its armature 2 the operating path for relay 201 causing it to release and at its armature the operating paths for relays 209 and 304 causing them to release. Relay 202 also locks to battery 117 through the contacts associated with its operated armature 2.

When relay 209 releases, it opens, at its armature 4, the self-stepping path for magnet 310 causing it to release. When magnet 310 releases switch 310 steps to its home or 0 contact position where it remains until the program information is dialed.

To briefly recapitulate, when the order set button 106 is operated, the switch 310 is stepped under control of the decimal indication of the dialed digits to the order position. When switch 310 reaches the order position it causes the switches 1012–16 in circuit 900 to step to the order position and lock under control of relay 211. The translator 400 determines whether the set of switches 1012–16 or 917–21 are to step. When the button 106 is released the counter 500 is reset and the switch 310 returns to its home position.

(4) *The time is dialed*

With the switches 1012–16 in the selector circuit 900 set at position 14, the time, the pitch or the yaw may be dialed to set the relays 7(A–EE)14 in circuit 700 associated with position 14 in accordance therewith. In the ten-step sequence of operations outlined above, the time is dialed before the pitch and the yaw. The time, pitch and yaw may be dialed, however, in any order.

The time is dialed as a four-digit number and indicates when the pitch and yaw commands for the respective order position are to be changed. In the storage circuit 700 there are fourteen relays 7(A–N)14 which register the termination time of the order position 14. Since there are 38 order numbers and positions there are all together 14 times 38 or 532 time storage relays. With fourteen relays and a minimum interval of one-tenth of a second the entire program has a maximum duration of 399.9 seconds or 6 minutes and 39.9 seconds.

In the illustrative example of a program, described above and partially shown in Fig. 17, the time that the pitch and yaw commands for the order position 14 are to be changed is 102.9 seconds after the beginning of the program. Each of the four digits 1, 0, 2 and 9 is dialed and stored as a four-digit binary number in the electronic counter 500. The dialing sequence is the same as described above for dialing the order number. After each operation of dial 101 the switch 310 is stepped one contact so that the four digits are steered successively through bank 1 of switch 310 to the input terminals A of the four sections of counter 500. The counter 500 provides the time indication in binary form to the counter register 501 and to the order position translator 400. The four sets of binary digits corresponding to the number 102.9 are 0001, 0000, 0010 and 1001. A positive operating potential appears at the terminal 1 of the hundreds section, terminal 2 of the units section; and terminals 8 and 1 of the tenths section of counter 500. The potentials appearing at these output terminals of the counter 500 cause the operation of the relays 503, 603, 605 and 608 in the register 501 and the relay 401 in the translator 400. As described above, lamps 512–17 and 611–18 are associated, respectively, with the relays 502–7 and 601–8 in the counter register 501. Selected ones of the lamps 512–17 and 611–18 are operated in accordance with the operation of the counter register relays 502–7 and 601–8 to provide a visual indication of the dialed digits. In the illustrative embodiment described herein relays 503, 603, 605 and 608 energize the associated lamps 513, 613, 615 and 618.

(5) *The time button 107 is operated*

After the operator has checked the dialing accuracy by observing the lamps in the counter register 501, the time button 107 is operated. When the time button 107 is operated, it provides a connection from battery 117 to lead 115 to cause the operation of the relays 1101–4 in the time setup circuit 1100. The relays 1101–4 are shunted, respectively, by the varistors 1011–14 which are poled to allow the relays 1101–4 to operate when a positive battery is connected to lead 115. When relay 1101 operates it opens, as is hereinafter described, the locking path for relay 202 causing it to release. The relays 1101–4 simultaneously operate to establish connections from the contacts of the operated relays 503, 603, 605 and 608 in the counter register 501 to leads 11 (A–N) which connect the time setup circuit 1100 to the selector circuit 900. Leads 11(A–N) are connected, respectively, to the brushes of banks A–N of switches 1012 and 1013 in the circuit 900. When relays 1101–4 are operated the leads 11(A–N) are energized in accordance with the digital information registered in the counter register 501.

With relays 503, 603, 605 and 608 operated in the register 501, the battery 650 is connected through the serially connected normal armatures of relays 638–31 and 537–32 in circuit 600, to the leads 11A, 11I, 11K and 11N from the circuit 1100. For the hundreds digits 01, for example, battery 650 is connected through the serially connected normal armatures of relays 638–31 and 537–3, the operated armature of relay 503, the contacts associated with the operated armature 2 of relay 1101 to lead 11A to the selector circuit 900. For the units digit 2, or in binary form 0010, battery 650 is connected through the serially connected normal armatures of relays 638–34, the operated armature of relay 603, the operated armature 2 of relay 1103, to lead 11I. In a similar manner for the tenths digit 9, the leads 11K and 11N are energized. Lead 11A is connected through the brush and contact 14 of bank A of switch 1012, cable 10A which passes through cable 1021 and the winding of relay 7A14 to ground. Relay 7A14 is operated and in a similar manner the rest of the binary digital information registered in the counter register 501 is connected through the time setup circuit 1100 and banks B through N of switches 1012 and 1013 to selectively operate the time relays in the storage circuit 700 which correspond to the order position 14. With relays 503, 603, 605 and 608 operated in the counter register 501, the operation of the time setup circuit 1100 causes the operation of the relays 7A14, 7I14, 7K14 and 7N14.

With relays 7A14, 7I14, 7K14 and 7N14 operated the time for ending the fourteenth order number, 102.9 seconds, is stored in circuit 700. When the relays 7A14, 7I14, 7K14 and 7N14 operate they lock to battery 814 through their respective operated armatures and the normal armature of the erase relay 8EE14.

When relay 1101 in the time setup circuit operates, it also opens the operating path at its armature 1 for relay 202 in the control circuit 200. Relay 202, as described above, is locked operated over a path through the contacts associated with its operated armature 2, the normal serially connected armatures 1 of relays 1203, 1201 and 1101, the normal contactor of the button 105, the normal contactor of the button 106, the operated armature 2 of relay 204, the normal contactor of button 104 and switch 118 to battery 117. When relay 202 releases it readies a connection from battery 117 through its normal armature 1 for the relays 209 and 304. The operating paths for relays 209 and 304, however, are open at the armature 1 of relay 1101.

When the time button 107 is released, the time setup relays 1101–1104 release and the release of relay 1101 completes a path from battery 117 to the windings of relays 209 and 304. When the relays 1101–4 release, the operating paths for relay 7A14, 7I14, 7K14 and 7N14 in circuit 700 are opened but they remain operated over their locking paths through the normal armature of relay 8EE14. Relay 209 functions, as described above, to return the switch 310 to its home position and to reset the counter 500. Briefly, when relay 209 operates it extends its operating path through its armature 4, the normal armature 3 of relay 207, the normal armature of the magnet 311, lead 127, lead 312 to the stepping magnet 311 causing it to operate. The stepping switch 310 at this time is at a contact position corresponding to the last dialed digit of the time designation, which is 9.

The stepping switch is stepped, in this manner, to contacts 19. When the brush of bank 7 reaches contact 19 an operating path is provided for relay 201 causing it to operate. When relay 201 operates it resets counter 500 and causes the operation of relay 202. When relay 202 operates it releases relays 201, 209 and 304 and opens the self-stepping path for magnet 311 causing it to release and step the switch 310 once, to its home position. When counter 500 resets, it releases relays 503, 603, 605 and 608 in the register 501. Relays 7A14, 7I14, 7K14 and 7N14 in circuit 700 remain operated, however, through the normal armature of relay 8EE14.

(6) *The pitch magnitude is dialed*

After the time has been stored in circuit 700 either the yaw or the pitch may be dialed. As described above the time, pitch and yaw may be dialed in any order. The switches 1012–16 remain at the order position 14 after the time has been dialed and circuit 200 returned to its recording condition for receiving program information. The pitch is dialed as a four-digit number through provision is provided for storing pitch magnitudes up to a maximum of 7.9 times the acceleration of gravity. The first two digits that are dialed are therefore zeros. The four digits indicating the pitch are dialed and registered in the counter 500 in a manner similar to that described above for the order number and the time.

In the illustrative example tabulated above the pitch for order number 14 is —0.6 times the acceleration of gravity. Since the pitch is dialed as a four-digit number with the first two digits always being zero, the four dialed digits are 0, 0, 0 and 6. When digits 0, 0, 0 and 6 are dialed, the counter 500 operates the relays 606 and 607 in circuit 501. Relays 606 and 607 operate the lamps 616 and 617 to provide a visual indication of the dialed digits, and connect battery 650 to the pitch and yaw setup circuit 1200.

The pitch and yaw setup circuit 1200 includes four relays 1201–4, the first two of which are utilized to store the pitch and the last two of which are utilized to store the yaw. The relays 1201–4 are operated, as is hereinafter described, under control of the pitch buttons 110 and 111 and the yaw buttons 108 and 109 after the dialing accuracy is checked.

(7) *The plus pitch button 111 or the minus pitch button 110 is operated*

When the pitch is minus, button 110 is operated, and when the pitch is positive, the button 111 is operated. With a pitch of —0.6, the pitch button 110 is operated to establish a connection from battery 117 through switch 118 and the operated right contact of button 110, lead 129, to the brush of bank DD of switch 1016 in circuit 900. The brush of bank DD of switch 1016 is also connected to the winding of the relay 1301 in the pitch output circuit 1300 causing it to operate. The relay 1301 which is shunted by the varistor 1302 connects the battery 1303 instead of the battery 1304 to the resistive networks 13R1 and 13R2. The networks 13R1 and 13R2 are utilized, as is hereinafter described, during the transmission of the program to the receiving circuit 1402. The connection of battery 1301 to the circuits 13R1 and 13R2 performs no function at this time.

The brush of bank DD of switch 1016 is connected through contact 14 of bank DD and cable 10DD to the winding of relay 8DD14 causing it to operate and register the fact that the polarity of the pitch is negative. The relay 8DD14 is operated when the pitch is negative and no indication is provided to circuit 700 when the pitch is positive.

When the button 110 is operated, a connection is also provided from battery 117 through the left operated armature of button 110, lead 128, to the windings of relays 1201 and 1202 in the pitch and yaw setup circuit 1200. The relays 1201 and 1202 are shunted, respectively, by the varistors 1205 and 1206. The pitch and yaw setup circuit, as described above, includes four relays 1201–4, with relays 1201–2 being operated to register the pitch and relays 1203–4 being operated to register the yaw. When relays 1201 and 1202 operate the information registered in the counter register 501 is provided to the selector circuit 900 and thence to the storage circuit 700 in a similar manner, as described above, when the time information was supplied to the storage circuit 700.

With relays 606 and 607 in register 501 operated, the battery 650 is connected through the serially connected normal armatures of relays 638 and 637, the operated armature of relay 606, the contacts associated with the operated armature 3 of relay 1202, lead 12S, the brush of bank S of switch 1014, contact 14 of bank S of switch 1014, cable 10S through cable 1021, the winding of relay 8S1 to ground. Battery 650 is also connected through the normal armature of relay 638, the operated armature of relay 607, the operated armature 2 of relay 1206, lead 12T, the brush of bank R of switch 1014, contact 14 of bank T, cable 10T through cable 1021, to the winding of relay 8T14. In this manner when the circuit 1200 operates it supplies the digital information from register 501 to circuit 700. Relays 8S14 and 8T14 lock to battery 814 through the normal armature of relay 8EE14.

There are eight storage relays 7(O–Q)14, 8(R–U)14 and 8DD14 which are utilized to store the pitch for the order position 14. The first seven relays register the magnitude and the relay 8DD14 the polarity. Relay 8DD14 is operated as described above for negative pitch numbers. Since there are 38 order positions and eight pitch storage relays for each order position there are 38 times 8, or 304 pitch storage relays in all. There are also, as is hereinafter described, a similar number of yaw storage relays.

When relay 1201 operates it also opens at its armature 1 the locking path for relay 202 causing it to release.

When the pitch button 110 is released relays 1201 and 1202 release and disconnect the circuit 900 from register 501. The relays 8R14 and 8S14 remain operated over the locking paths to battery 814. When relay 1201 releases it completes an operating path for relays 209 and 304. The operating paths for relays 209 and 304 are through the normal armature 1 of relay 202, the serially connected normal armatures 1 of relays 1203, 1201 and 1101, the normal button 105, the normal button 106, the operated armature 2 of relay 204, the normal button 104, and switch 118 to battery 117.

When relay 209 operates it functions, as described above, to return the switch 310 to its home position and to reset the counter 500. Briefly, when relay 209 operates it extends its operating path to the winding of magnet 311 causing it to operate. The switch 310 is at this time at position 6, which is the last dialed digit of the pitch number. The switch 310 steps until position 19 is reached, when an operating path is provided through its bank 7 for relay 201. When relay 201 operates it resets counter 500 and operates relay 202. Relay 202 releases relays 201, 209 and 304 and opens the path for magnet 311 causing it to release and step the switch 310 to its home position. When counter 500 resets it releases relays 606 and 607 in register 501. Relays 606 and 607 turn off lamps 616 and 617.

(8) *The magnitude of the yaw is dialed*

The yaw is dialed and stored in a similar manner as the pitch. In the illustrative program tabulated above, for the order position 14, the yaw is +0.1. The yaw is dialed as a four-digit number with the first two digits always being zero. The four digits 0, 0, 0 and 1 are dialed and dial pulses are steered successively through the contacts of bank 1 of switch 310 to the input terminals A of counter 500. Counter 500 operates relay 608 in register 501 which energizes lamp 618 to provide a visual indication of the dialed digits.

(9) *The plus yaw button 109 or the minus yaw button 108 is operated*

When the yaw is negative button 108 is operated and when the yaw is positive button 109 is operated. The sequence following the operation of one of the buttons 108 or 109 is quite similar to that which occurred for registering the pitch when button 110 or 111 is operated.

Briefly, when button 109 is operated it connects battery 117 to the windings of relays 1203 and 1204 in circuit 1200 which are shunted by the varistors 1207 and 1208. When relays 1203 and 1204 operate, the information registered in register 501 is supplied through circuit 900 to the yaw storage relays 8(V–Z)14, 8AA14, 8BB14 and 8CC14 associated with the order position 14. The operation of relay 8CC14 indicates a negative yaw number. With relay 608 in register 501 operated an operating path is provided from battery 650 through the operated armature of relay 608, the contacts associated with the operated armature 1 of relay 1204, lead 12BB, the brush and contact 14 of bank BB of switch 1015, cable 10BB through cable 1021, to the winding of relay 8BB14 causing it to operate. Relay 8BB14 operates and locks to battery 814 through the normal armature of the erase relay 8EE14.

When relay 1203 operates it opens at its armature 1 the locking path for relay 202 causing it to release.

When the button 109 is released it in turn releases relays 1203 and 1204. When relay 1203 releases it closes at its armature 1 an operating path through the normal armature 1 of relay 202 for relays 209 and 304. When relay 209 operates it causes magnet 311 to step and release, as described above, until the switch 310 has stepped from contacts 1 to contacts 19. The brush of bank 7 of switch 310 completes a path through its contact 19 from battery 117 to the winding of relay 201 causing it to operate. When relay 201 operates it resets counter 500 and operates relay 202. Relay 202 releases relays 201, 209 and 304 and opens the operating path for magnet 311 causing it to step the switch 310 to its home position. When counter 500 resets it releases relay 608 which turns off lamp 618.

This completes the registration of the time, pitch and yaw for order number 14. For the time of 102.9, pitch of —0.6 and yaw of 10.1 the relays 7A14, 7I14, 7K14, 7N14, 8T14, 8S14, 8DD14 and 8BB14 in the circuit 700 are operated.

(10) *The programmer reset button 104 is operated*

Before the next order number is dialed to store the time, pitch and yaw digital information corresponding thereto, it is necessary to restore the switches 1012–16 to the 0 contact or home position. This is necessary because the brushes of the information banks of switches 917–21 are connected respectively to contacts 0 of the information banks of switches 1012–16. Since the digital information is supplied from register 501 to the brushes of the information banks of switches 1012–16 it is necessary to have these switches set at their home position for order numbers greater than 19. For order numbers 20–38 the switches 1012–16 function as a connector from the setup circuits 1100 and 1200 to the brushes of the information banks of switches 917–21.

If switches 1012–16 remain at order position 14 and are not returned to their home position, the time, pitch and yaw digital information for order position 29, for example, is supplied from register 501 to the relays 7(A–Q)14, 8(R–Z)14, etc. instead of to the storage relays associated with the order position 29. It is therefore necessary to return switches 1012–16 to this home contact position before dialing the next order number. Operating the program reset button 104, moreover, is necessary, as is hereinafter described, to ready circuit 200 for the transmission of the program, as well as for further recording.

When the programmer reset button 104 is operated it connects battery 117 to the winding of relay 209 causing it to operate, opens the operating paths for relays 202, 204, 211 and 302 causing them to release, and returns the switches 1012–16 to their home position. When relay 209 operates it extends its operating path through its operated armature 4 and the normal armature 3 of relay 207, the normal armature of the stepping magnet 311 to the dial 101 back through lead 312 to the winding of the stepping magnet 311 causing it to operate and step the switch 310.

When the button 104 is operated it also opens the locking circuit for relay 204 causing it to release, but relay 204 reoperates when relay 202 releases over a path from battery 117 through the operated button 104, the normal armature 1 of relay 202, the serially connected armatures 1 of relays 1203, 1201 and 1101, and the normal buttons 105 and 106 to the winding of relay 204.

When button 104 is operated it also connects battery 117 to contact 19 of bank 6 of switch 310. The switch 310 steps until the brushes of switch 310 arrive at contacts 19. The brush of bank 6 provides a path from battery 117 to the operated armature 3 of relay 209, the normal armature 2 of relay 207, lead 124, and lead 312 to the winding of the stepping magnet 311. The magnet 311 is in this manner held operated until the operation of relay 201. Relay 201 operates when the brush of bank 7 reaches contact 19. When relay 201 operates it in turn operates relay 202. When relay 202 operates it releases relay 201 and relays 209 and 304. When relay 209 releases it releases the magnet 311 returning switch 310 to its home position.

When button 104 is operated, as indicated above, it also releases relay 211 and returns the switches 1012–16 to their home position. The operating path for relay 211 is from ground through the operated armature 3 of relay 302, the operated armature of relay 211, the normal armature of relay 301, the operated armature 2 of relay 204, normal button 104, and switch 118 to battery 117.

The winding of relay 302 which is connected to the same operating path also releases.

The locking path for relay 211 is the same path that is extended to the winding of magnet 1002 so that the locking potential is removed from magnets 1002–6 allowing them to release. When the locking path for magnets 1002–6 is opened they are operated and released over the self-stepping path through their normal armatures, lead 1025, the normal armature 2 of relay 402, the operated armature of relay 208, the normal button 106, the operated armature 2 of relay 204, and through the operating path of relay 204, described above, to battery 117. The switches 1012–16 are in this manner stepped until a stopping potential is reached. Bank 4 of switch 310 provides the stopping potential for the switches 1012–16 through cable 1025 and the banks HO of switches 1012–16.

The switches 310 and 1012–16 are stepped around at the same time. The switches 1012–16 can never get ahead of the switch 310 due to the advance of the locking potential through the brush of bank 4 of switch 310. The switches, in this manner, step synchronously and when switch 310 steps to its home position the switches 1012–16 also step to their home position. The magnets 1002–6 are locked operated at their home position through lead 1027 to contact 0 of bank 4 of switch 310. Lead 1027 is effectively part of cable 1022.

When the programmer reset button 104 is released, relay 204 is again released. When relay 204 releases it closes an operating path through its normal armature 3 for relay 207. When the button 104 releases it also releases the locking path for magnets 1002–6 causing them to release and step the switches 1012–16 to contacts 1.

With the switch 310 in the control circuit 200 at its home position and the switches 1012–16 in the selector circuit 900 at contact position 1 the programmer is ready to setup another order number or to transmit the setup program.

*Changing an order*

If the time, pitch and yaw information for an order number is to be changed the following sequence is utilized:

(1) The record button 102 is operated
(2) The order number is dialed
(3) The order set button 106 is operated
(4) The erase button 112 is operated
(5) The new time pitch and yaw information is dialed and registered
(6) The program reset button 104 is operated Only step (4), operating the erase button 112, has not been described above. If the order number to be changed is 14, when the erase button 112 is operated, it connects battery 117 to lead 131, the brush of bank EE of switch 1016, contact 14 of bank EE, cable 10EE through cable 1021 to the winding of relay 8EE14 causing it to operate. When relay 8EE14 operates, it opens the locking paths for the operated ones of relays 7(A–Q)14, 8(R–Z)14, etc. causing them to release.

With the storage relays of order position 14 released, the new information may be dialed and set up. In this manner an individual order may be readily erased and the new or changed information stored without disturbing the other order position information.

*Transmitting the program*

When the program stored in the storage circuit 700 is to be supplied to the receiving circuit 1402, the transmit button 103 is operated. When the transmit button 103 is operated it connects battery 117 to the winding of relay 303 causing it to operate. The winding of relay 303 is connected to ground in a stop control circuit 225, and is shunted by the varistor 307 poled to allow relay 303 to operate upon the connection thereto of a positive source of potential. The circuit 225 functions, as is hereinafter described, after the program has been transmitted to remove the ground connection.

When relay 303 operates, it removes an inhibiting ground at its armature 3 from the time oscillator 116 and readies circuit 1402. The oscillator 116 is a source of timing pulses generated at a rate of ten per second. When the ground connection at relay 303 is removed the oscillator 116 provides the timing pulses through the normal armature 4 of relay 202 and cable 214 to the input terminal A of the tenths section of counter 500. With relay 203 released the sections of the counter 500 are serially connected to function as a single four-stage counter. The counter 500, which has four stages in the tenths, units and tens sections and two stages in the hundreds section, can count the elapsed time up to 399.9 seconds.

The counter 500 supplies changing potentials in accordance with the elapsed time through its output terminals 1, 2, 4 and 8 to the counter register 501 and to the order position translator 400. The order position translator 400 performs no function at this time but the operated ones of relays 502–7 and 601–8 in the counter register 500 provide a binary coded representation of the elapsed time to a matching circuit 600. The matching circuit 600 includes the relays 532–7 and 631–8 which are associated individually with the relays 502–7 and 601–8 in the counter register 501. The relays 532–7 and 631–8 are shunted, respectively, by the varistors 542–7 and 641–8.

The circuit 600 functions to match the time supplied from register 501 with the time stored for the first order number in circuit 700. The matching circuit 600 is connected through the normal time setup circuit 1100 and leads 11A through 11N therefrom to the brushes of banks A through N of the selector circuit 900. The brushes of banks A through N are at, as described above, the contact 1 position. Depending upon the operation of the time storage relays of the first order position, combinations of the matching circuit relays are operated. There is one matching relay for each of the 14 storage relays. In the illustrative example, tabulated above, and shown in Fig. 17, the time for ending the first order number is 2 seconds, and the pitch and yaw are respectively +3.3 and +1.0. In circuit 700 the relays 7I1, 7P1, 7Q1, 8T1, 8U1 and 8X1 are operated to store this information. With the time storage relay 7I1 operated an operating path is provided for relay 633 in circuit 600. The operating path is from battery 801, through the normal armature of the erase relay 8EE1, the operated armature of relay 7I1, cable 10I through cable 1021, contact 1 of bank I of switch 1013, lead 11I, the normal armature 2 of relay 1103, the winding of relay 633, lead 551, and the operated armature 4 of relay 303 to ground.

As soon as relay 303 operates, it causes relay 603 in the matching circuit 600 to operate. In this manner the time stored for ending the first order number is provided from circuit 700 through circuit 900, and circuit 1100 to the matching circuit 600. The circuit 600 remains in this condition until the register 501 provides an elapsed time indication of 2 seconds to the circuit 600.

When the register 501 registers an elapsed time which is equal to the time provided to circuit 600 from circuit 700, a match occurs, as is hereinafter described, and the switches 1012–16 are stepped to the next order number.

During the first two seconds that the oscillator 116 supplies timing pulses to counter 500, the circuit 700 supplies the pitch and yaw for the first order number to the receiving circuit 1402. When relay 303 was operated, as indicated above, the receiving circuit 1402 is readied for the reception of the pitch and yaw stored for the first order number. When relay 303 is operated it connects ground through its operated armature 3 and lead 319 to the winding of relay 1414 in circuit 1402. Relay 1414 which is connected to battery 1415 operates to extend connections from the amplifiers 1400 and 1401, Zero time for the program is when relay 1414 operates. Relay 1414 completes the connection a relatively short time after the operation of the transmit button 103.

With relays 7P1, 7Q1, 8T1 and 8U1 operated for the pitch and relay 8X1 operated for the yaw, a pitch +3.3 and a yaw of +1.0 are supplied through the selector circuit 900, the pitch and yaw setup circuit 1200 to the pitch converter circuit 1300. The converter circuit 1300 functions to translate the binary coded information stored in circuit 700 to an analogue representation thereof for use by the circuit 1402. The pitch converter circuit 1300 includes seven relay 1310-16 which correspond individually with the seven pitch magnitude relays in each order position. With the switches 1012-16 in circuit 900 set at contact 1 the windings of relays 7(O-Q)1 and 8(R-U)1 are connected through leads through banks O-U of the switch 1014, leads 12(O-U), contacts of the normal armatures 1201 and 1202, and leads 13(O-U) to the windings of relays 1310-16. The windings of relays 1310-16 are shunted by the varistors 1320-26 which are poled to allow the relays 1310-16 to operate upon the connection thereto of a positive source of potential. The operated ones of relays 7(O-Q)1 and 8(R-U)1 are connected through their operated armatures to the source 801. In this manner the battery 801 is connected through the operated ones of the relays 7(O-Q)1 and 8(R-U)1 to the corresponding ones of relays 1310-16. With a pitch of +3.3 and relays 7P1, 7Q1, 8T1 and 8U1 operated the relays 1311, 1310, 1315 and 1316 are operated. The operating path for relay 1310, for example, is through lead 13Q, the normal armature 2 of relay 1201, lead 12Q, the brush of bank Q of switch 1014, contact 14 of bank Q of switch 1014, cable 10Q through cable 1021 and the operated armature of relay 7Q1 to battery 801. At the same time that the relays 1310, 1311, 1315 and 1316 are being operated in the pitch output circuit 1300, relays not shown in the yaw output circuit 1301 are being operated under control of the yaw storage relays 8(V-Z)1, 8AA1 and 8BB1. The yaw converter circuit 1301 is similar to the pitch converter circuit 1300. The circuits 1300 and 1301 are operated in this manner under control of the storage relays for the first order position in the circuit 700.

The circuits 1300 and 1301 supply a potential, the polarity of which is determined by the relays 1301 and 1305, respectively, and the magnitudes of which are controlled by the relays 1310-16 in each of the circuits. The windings of the relays 1301 and 1305 are connected, respectively, through banks CC and DD of circuit 900 to the windings of the relays 8CC1 and 8DD1. These relays, as described above, are operated when the pitch and yaw, respectively, are negative. Since, for the first order position, both the pitch and yaw are positive neither the relay 8CC1 nor the relay 8DD1 is operated at this time. The relays 1301 and 1305 are therefore both normal. With relays 1301 and 1305 normal the positive potential sources 1304 and 1308, respectively, are connected to resistive networks. The source 1304 is connected through the normal armature of relay 1301 to the resistive networks 13R1 and 13R2.

The resistive network 13R1, which is controlled by relays 1310-12, provides a potential proportional to the magnitude of the units digit of the pitch to an amplifier 1400. The resistive network 13R2 provides a potential proportional to the magnitude of the tenths digit of the pitch as determined by the selective operation of the relays 1313-16, to the amplifier 1400. The network 13R1 includes eight resistors 1330-7 because the maximum pitch, as described, that is required is 7.9, and network 13R2 includes ten resistors 1340-9. With relays 1310 and 1311 operated for the units digit a path is provided from battery 1304 through the normal armature of relay 1301, resistor 1337, resistor 1336, the operated armature 2 of relay 1310, the operated armature 3 of relay 1311, the normal armature 3 of relay 1312 and resistor 1403 to the amplifier 1400. With relays 1315 and 1316 operated for the tenths digit a path is provided from battery 1304 through resistors 1349-3, the normal armature 1 of relay 1314, the operated armature 4 of relay 1315, the operated armature 4 of relay 1316 and resistor 1404 to the amplifier 1400.

In a similar manner potentials are provided from the circuit 1301 through resistors 1408 and 1407 to the amplifier 1401 in accordance with the yaw indication. The amplifiers 1400 and 1401, which are summing amplifiers, are energized, respectively, from the 300-volt sources 1409 and 1411 which are connected thereto through the resistors 1410 and 1412. Feedback paths are provided for the amplifiers 1400 and 1401, respectively, through the resistors 1405 and 1406. The output from the amplifiers 1400 and 1401 is connected to armatures of relay 1414. Relay 1414, is operated, as described above, upon the operation of relay 303 when the transmit button 103 is operated. When relay 303 operates, therefore, the pitch and yaw information for the first order position are supplied to the readied receiving circuit 1402. The same analogue potentials are provided to the receiving circuit 1402 until the matching circuit 600 is operated.

During the time that the output analogue potentials of the pitch and yaw for the first order number are supplied to the circuit 1402, the relays 501-7 and 601-8 continue to selectively operate and release under control of counter 500, and relay 633 in the matching circuit 600 remains operated. Whenever a matching relay, such as relay 633, is operated it opens a path from battery 650 to the winding of relay 550. When both a counter register relay and its associated matching circuit relay are operated this gap is closed. The result of this arrangement is to prevent the operation of relay 550 except when the counter register relays operate in exactly the same pattern as the matching circuit relays. Relay 550 operates when the elapsed time registered by register 501 is the same as the time supplied from circuit 700 to the circuit 600. The counter register relays change under control of the counter 500 but the matching circuit relays remain set until the order position is changed. When a match occurs relay 550 is operated and the switches 1012-16 are stepped to the next order position. When this occurs the pattern of operated relays in the matching circuit 600 is changed and a new pitch and yaw output is provided to the receiving circuit 1402.

With relay 633 operated to indicate a time of 2.0 seconds, when relay 603 operates it completes a path from battery 650 through the serially connected normal armatures of relays 638-4 to the serially connected normal armatures of relays 632-1 and 537-2 and the winding of relay 550 causing it to operate.

When relay 550 operates, it opens a short-circuit path across capacitor 554 allowing it to charge from battery 551. The capacitor 554 which is connected, as described above, to the self-stepping contacts of switches 1012-16 and also to the brush of bank 4 of switch 310 functions to absorb some of the current when the contacts open to reduce arcing. When relay 550 operates battery 553 is disconnected to provide a stepping pulse through lead 555, the operated armature 1 of relay 303, the operated armature 1 of relay 207, the normal armature 2 of relay 402, to the brush of bank 4, and also to lead 1025, and the normal armatures of magnets 1002-6 causing them to release. When magnets 1002-6 release they step the switches 1012-16 to the second order position.

When the switches 1012-16 step they connect the windings of the storage relays 7(A-N)2 to the matching circuit 600 and the windings of relays 7(O-Q)2, 8(R-Z)2, 8AA2 and 8BB2, respectively, to the pitch and yaw output circuits 1300 and 1301. The settings of the matching relays 532-6 and 631-8 and the analogue potentials provided to circuit 1402 are changed in accordance with the time, pitch and yaw digital information stored for the second order position.

When selected ones of the relays 532–6 and 631–8 operate, the operating path for relay 550 is opened causing it to release and short-circuit capacitor 554. With capacitor 554 short-circuited, the magnets 1002–6 reoperate. When magnets 1002–6 operate, they lock through their banks HO, cable 1022 and bank 4 of switch 310 to battery 553. The switch 310 is stepped, as is hereinafter described, together with switches 1012–16. The magnets 1002–6 remain operated until relay 550 is operated again to indicate the next match.

At the same time that battery 553 is disconnected, or the stepping pulse is provided to magnets 1002–6, it is also provided to the magnet 311. The pulse is provided through lead 555, the operated armature 1 of relay 303, the operated armature 2 of relay 207, lead 124 and lead 312 to the winding of magnet 311. The switches 310 and 1012–16 are, in this manner, advanced whenever a match occurs between the information supplied from circuit 700, and register 501 and at each step or order number the pitch and yaw stored in circuit 700 therefor is supplied to circuit 1402. The time from the occurrence of a match until the pitch and yaw to circuit 1402 changes is in the order of 20 to 30 milliseconds.

When the switches 1012–16 reach contact 19, the circuits 200, 400 and 900 are readied to transfer the connections to step switches 917–21 instead of switches 1012–16. When the brush of bank 4 of switch 310 reaches its nineteenth contact connection from battery 553 is extended therethrough to the normal armature 1 of relay 302, the normal armature 1 of relay 209 and the normal armature 2 of relay 212 to the winding of relay 212 causing it to operate. When relay 212 operates it locks to battery 117 through the contacts associated with its operated armature 2, the normal button 104 and switch 118. When relay 212 operates it extends its original operating path from the normal armature 1 of relay 209 through the contacts associated with its operated armature 1, to the contacts 20 of banks HO of switches 917–21, and also through the normal armature 1 of relay 304, contact 39 of bank 5 of switch 310, the brush of bank 5 of switch 310, lead 925 and the normal armatures of magnets 907–11 to the winding of magnets 907–11. When magnets 907–11 operate they lock to the potential applied through contacts 20 of bank HO thereof.

When relay 212 operates, it also connects battery 117 through the contacts associated with its operated armature 2, the operated armature 4 of relay 207 to the winding of relay 402 causing it to operate. When relay 402 operates, it transfers the connection from battery 553 to the brush of bank 5 instead of to the brush of bank 4, and to the open armatures of magnets 917–21. The armatures of magnets 1002–6 remain operated until the path from battery 553 is again interrupted. Magnets 1002–6 remain operated over a path through the banks HO, cable 1022, contact 19 of bank 4, the normal armature 1 of relay 302, the normal armature 1 of relay 209, the contacts associated with the operated armature 1 of relay 212, the normal armature 1 of relay 304, contact 39 of bank 5 of switch 310, the brush of bank 5 of switch 310, the contacts associated with the operated armature 2 of relay 402, the operated armature 1 of relay 207, the operated armature 1 of relay 303, lead 555, the normal armature of relay 550 to battery 553. In this manner when relay 402 operates to indicate that the next order number, which is 20, is to be stepped off by switches 917–21, a locking path is provided for magnets 1002–6.

When the connection from battery 553 is again interrupted, switches 1012–16 step to home and switches 917–21 step to order position 20. The program continues with order numbers 20–38 being transmitted while switches 1012–16 remain at their home position. The program is in this manner transmitted to the receiving circuit 1402 with the pitch and the yaw controlled by circuit 700 and the order position changes controlled by the matching circuit 600.

When the button 103 is released or when the stop control 225 removes the ground connection, relay 303 releases. When relay 303 releases, it returns the ground connection to oscillator 116 causing it to stop supplying timing pulses to the counter 500, and it also releases relay 1414. When relay 303 releases it also opens the holding path from battery 553, through its armature 1 causing the magnet 311, and the operated magnets in circuit 900, to release.

The circuit 225, which is essentially a counting device, removes the ground potential when the switch 310 steps from contact 38 to contact 39. The circuit 225 includes the eighth bank of switch 310, which, when stepped 39 times after the transmit button 103 is operated, removes the ground connection. The transmit button 103, of course, can be released at any point in the program to stop the program transmission.

It is to be understood that the above-described arrangements are illustrative of the application of the principles of this invention. Numerous other arrangements may be devised by those skilled in the art without departing from the spirit and scope of the invention. For example, the number of orders, or variables, may be larger or smaller, the maximum program duration may be increased, and coding arrangements other than binary or decimal may be utilized.

What is claimed is:

1. A programmer for storing and transmitting information in the form of a plurality of step-functions, with each step being an order in a program of orders, comprising a device for providing serially arranged groups of predetermined numbers of electrical impulses, first means for providing a coded representation of the number of impulses in each of said groups, a selector circuit having a plurality of order positions, first control means for setting said selector circuit in accordance with said coded representations of the number of impulses in some of said groups at any one of said positions, a memory circuit for each of said order positions of said selector circuit for storing said coded representations of the number of impulses in the rest of said groups, second control means for successively providing said coded representations of the number of impulses of said rest of said groups to the one of said memory circuits that is associated with the order position at which said selector circuit is set, means for resetting said first means after each operation of said first control means and after each operation of said second control means, a source of timing impulses, second means for continuously providing coded representations of the sum of the impulses from said source, means for matching said coded representations from said second means with some of said coded representations stored in any one of said memory circuits, means controlled by said matching means for stepping said selector circuit to another one of said positions whenever a match occurs, and means for converting the rest of said coded representations stored in said memory circuit that is being matched to analogue representations.

2. A programmer comprising a dial for producing sequences of electrical impulses; a counter for summing and registering said electrical impulses; a plurality of control switches; a plurality of sequence switches connectable upon the operation of any of said control switches to said counter and having a plurality of order positions; stepping means responsive upon the operation of one of said control switches for positioning said sequence switches in accordance with said electrical impulses from said device; storage means for each of said positions of said sequence switches connectable by said switches to said counter; means controlled by said dial and responsive to the operation of all except said one of said control switches for controlling the operation of said storage means; and means responsive after the operation of said stepping means and also after the operation of said storage means for resetting said counter.

3. Apparatus for storing and supplying a program of orders in the form of a plurality of step-functions comprising a device for serially providing a predetermined number of electrical impulses arranged in groups, means for counting said impulses and for providing a coded representation of the sum of impulses in each of said groups of impulses, a plurality of storage components arranged in order groups for storing said program of orders, means connectable to and thereupon controllable by said counting means for selecting any one of said order groups, connect and disconnect means for briefly connecting said selecting means to said counting means, means responsive upon the operation of said connect and disconnect means for resetting said counting means, and means for connecting portions of said selected order group of storage components to said counting means to store said coded representations of said groups of impulses.

4. A programmer for storing and transmitting information in the form of a plurality of step-functions with each step being an order in a program of orders comprising a device for providing serially arranged groups of predetermined numbers of electrical impulses, first means for providing a coded representation of the number of impulses in each of said groups, a selector circuit having a plurality of order positions, first control means for setting said selector circuit in accordance with said coded representations of the number of impulses in some of said groups at any one of said positions, a memory circuit for each of said order positions of said selector circuit for storing said coded representations of the number of impulses in the rest of said groups, second control means for successively providing said coded representations of the number of impulses in said rest of said groups through said set selector circuit to the associated one of said memory circuits, and means for resetting said first means after each operation of said first control means and after each operation of said second control means.

5. In combination, a counter having a plurality of decades which are normally serially connected, means connectable successively to each of said decades for providing a digital input in the form of dial pulses, a source of timing pulses normally connected to one of said decades, a control circuit for disconnecting said source and for connecting said dial pulse providing means successively to said decades, a selector circuit, means controlled by said counter upon the operation of said control circuit for setting said selector circuit in accordance with said digital input, a storage circuit connected to each setting of said selector circuit, and means responsive upon the operation of said setting means for resetting said counter.

6. A programmer for storing coded information and for transmitting analogue information as a program of orders comprising a device for providing groups of predetermined numbers of electrical impulses, first means for providing a coded representation of the number of impulses in each of said groups, a plurality of selectable memory circuits, a selector circuit having a plurality of order positions for setting said selector circuit in accordance with said coded representations of the number of impulses in some of said groups, control means for successively providing said coded representations of the number of impulses in the rest of said groups to said selected memory circuit, means for resetting said first means after each operation of said selector circuit and after each operation of said control means, a source of timing impulses, second means for continuously providing coded representations of the sum of the impulses from said source, means for matching said coded representations from said second means with some of said coded representations stored in any one of said memory circuits, means controlled by said matching means for stepping said selector circuit to another of said order positions whenever a match occurs, means for converting the rest of said coded representations stored in said memory circuit that is being matched to an analogue representation thereof, and means for disabling said matching means after said coded representations stored in every one of said memory circuits have been converted by said converting means.

7. A programmer for storing and transmitting information in the form of a plurality of step-functions with each step being an order in a program of orders comprising a device for providing serially arranged groups of predetermined numbers of electrical impulses, first means for providing a coded representation of the number of impulses in each of said groups, a selector circuit having a plurality of order positions, first control means for setting said selector circuit in accordance with said coded representations of the number of impulses in some of said groups at any one of said positions, a memory circuit for each of said order positions of said selector circuit for storing said coded representations of the number of impulses in the rest of said groups, second control means for successively providing said coded representations of the number of impulses in said rest of said groups to the selected one of said memory circuits, means for resetting said first means after each operation of said first control means and after each operation of said second control means, a source of timing impulses, second means for continuously providing coded representations of the sum of the impulses from said source, means for matching said coded representations from said second means with some of said coded representations stored in any one of said memory circuits, and means controlled by said matching means for stepping said selector circuit whenever a match occurs.

8. A programmer for storing and transmitting information in the form of a plurality of step-functions with each step being an order in a program of orders comprising a device for providing serially arranged groups of predetermined numbers of electrical impulses, first means for providing a coded representation of the number of impulses in each of said groups, a plurality of selectable memory circuits for storing said coded representations of the number of impulses in some of said groups, means for selecting any one of said memory circuits, first control means for setting said selecting means in accordance with said coded representations of the number of impulses in the rest of said groups, second control means for successively providing said coded representations of the number of impulses in said some of said groups to said selected memory circuit, means for resetting said first means after each operation of said first control means and after each operation of said second control means, and means for erasing said coded representation stored in any one of said memory circuits without disturbing the storage of said coded representations in the rest of said memory circuits.

9. Apparatus for storing and supplying a program of orders in the form of a plurality of step-functions comprising a device for providing a predetermined number of electrical impulses arranged in groups, means for counting said impulses and for providing a coded representation of the sum of impulses in each of said groups of impulses, a plurality of storage components arranged in order groups for storing said program of orders, means connectable to and thereupon controllable by said counting means for selecting any one of said order groups, connect and disconnect means for briefly connecting said selecting means to said counting means, means responsive upon the operation of said connect and disconnect means for resetting said counting means, means for connecting portions of said selected order group of storage components to said counting means to store said coded representations of some of said groups of impulses, and electromechanical means for releasing said storage components of any one of said order groups.

10. A dial-controlled storage system for supplying a program of information repeatedly or with changes in individual portions thereof comprising a plurality of electromechanical storage elements for each order of said program of information, means for supplying predetermined numbers of electrical pulses to indicate the order number of said program and also the information to be stored for said order number, means controlled by said order number indication from said electrical pulse supply means for selecting any one of said pluralities of storage elements, means for providing said information to be stored from said supply means to said selected plurality of storage elements, means for releasing any operated ones of said storage elements in said selected plurality of elements, a receiving circuit connectable to each of said pluralities of storage elements for receiving said information, and means for successively connecting said pluralities of elements to said receiving circuit.

11. A dial-controlled programmer for supplying a program of orders comprising a dial for supplying the program information for each of said orders, the time for terminating each of said orders and the position of each of said orders in said program, a memory circuit for each of said orders, means controlled by said dial for selecting any one of said memory circuits in accordance with said order position, means for storing said program information and said terminating time in said selected memory circuit, means connectable to each of said memory circuits for receiving said program information, and means for successively connecting said memory circuits to said receiving means for periods of time determined by said terminating time stored in said connected memory circuits.

12. A system for the electromagnetic storage of data respectively relating to orders in an information program, comprising a group of electromagnetic storage elements for each of said orders in said information program, means for supplying dial pulse signals including group selection dial pulse signals, means controlled by said supply means for selecting any one of said groups and for storing said signals in said selected group, and means for successively reading said groups but not disturbing the signal storage therein.

13. In combination, a counter having a plurality of decades which are normally serially connected, means connectable successively to each of said decades for providing a digital input in the form of dial pulses, a source of timing pulses normally connected to one of said decades, a control circuit for disconnecting said source and for connecting said dial pulse providing means successively to said decades, a selector circuit, means controlled by said counter upon the operation of said control circuit for setting said selector circuit in accordance with said digital input, a storage circuit connected to each setting of said selector circuit, means responsive upon the operation of said setting means for resetting said counter, an output circuit, and a step-by-step mechanism controlled by the counter when said source is connected thereto for successively setting said selector circuit to connect said output circuit to each of said storage circuits.

14. A programmer for supplying a program of orders comprising a dial for supplying the program information for each of said orders, the time for terminating each of said orders and the position of each of said orders in said program, a memory circuit for each of said orders, means controlled by said dial for selecting any one of said memory circuits in accordance with said order position, means controlled by said dial for supplying said program information and said terminating time to said selected memory circuit, means connectable to each of said memory circuits for receiving said program information, means for successively connecting said memory circuits to said receiving means for periods of time determined by said terminating time stored in said connected memory circuits, and means for erasing the stored program information of any one of said orders without disturbing the others including said dial for supplying the position of the order to be erased, said means for selecting any one of said memory circuits, and means for releasing said selected memory circuit which is to be erased.

15. A programmer for repeatedly transmitting a program of information comprising a selector circuit having a plurality of order positions, a memory circuit for each of said orders for storing a plurality of items of information, a source of timing pulses, first means for continuously providing coded representations of the sum of the pulses from said source, second means controlled by said selector circuit for providing a coded representation of each of the items of information stored in any one of said circuits, means for matching said coded representations from said first means with said coded representation of one of said items from said second means, an output circuit, means for supplying said coded representations of the rest of said items stored in said circuit being matched to said output circuit, and means controlled by said matching means for stepping said selector circuit to another one of said positions whenever a match occurs.

16. A system for the electromagnetic storage of data respectively relating to orders in an information program, comprising a group of storage elements for each of said orders in said information program, a pulse source, means controlled by said pulse source for selecting any one of said groups and for storing information in said selected group, and means for successively reading said groups but not disturbing the information storage therein.

17. A storage system for supplying a program of information repeatedly or with changes in individual portions thereof comprising a plurality of storage elements for each order of said program of information, means for supplying predetermined numbers of electrical pulses to indicate the order number of said program and also the information to be stored for said order number, means controlled by said order number indication from said electrical pulse supply means for selecting any one of said pluralities of storage elements, means for providing said information to be stored from said supply means to said selected plurality of storage elements, a receiving circuit connectable to each of said pluralities of storage elements for receiving said information, and means for successively connecting said pluralities of elements to said receiving circuit.

References Cited in the file of this patent
UNITED STATES PATENTS

| | | |
|---|---|---|
| 2,477,241 | Evers | July 26, 1949 |
| 2,621,250 | Spencer | Dec. 9, 1952 |
| 2,700,146 | Bachelet | Jan. 18, 1955 |